(12) United States Patent
Kim

(10) Patent No.: US 12,536,107 B2
(45) Date of Patent: Jan. 27, 2026

(54) MEMORY DEVICE AND COMPUTING SYSTEM INCLUDING MEMORY DEVICE

(71) Applicant: Samsung Electronics Co., Ltd., Suwon-si (KR)

(72) Inventor: Ho-Youn Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 18/776,498

(22) Filed: Jul. 18, 2024

(65) Prior Publication Data
US 2025/0265203 A1  Aug. 21, 2025

(30) Foreign Application Priority Data
Feb. 19, 2024  (KR) .................. 10-2024-0023782

(51) Int. Cl.
*G06F 13/16*  (2006.01)
*G06F 13/40*  (2006.01)
*G06F 13/42*  (2006.01)

(52) U.S. Cl.
CPC ...... *G06F 13/1657* (2013.01); *G06F 13/4022* (2013.01); *G06F 13/4221* (2013.01)

(58) Field of Classification Search
CPC ............. G06F 13/1657; G06F 13/4022; G06F 13/4221
USPC ........................................................ 710/316
See application file for complete search history.

(56) References Cited

U.S. PATENT DOCUMENTS

| | | | |
|---|---|---|---|
| 5,206,941 A | 4/1993 | Eikill et al. | |
| 7,120,673 B2* | 10/2006 | Kitamura | G06F 3/067 709/213 |
| 9,274,955 B2 | 3/2016 | Lih et al. | |
| 10,878,924 B2* | 12/2020 | Choi | G06F 3/0659 |
| 11,205,243 B2 | 12/2021 | Uhrenholt et al. | |
| 11,461,263 B2* | 10/2022 | Malladi | G06F 3/0679 |
| 12,229,409 B2* | 2/2025 | Kim | G06F 3/0659 |
| 2017/0147431 A1* | 5/2017 | West | G06F 3/0619 |
| 2019/0056990 A1* | 2/2019 | Suh | G06F 3/068 |
| 2020/0089421 A1* | 3/2020 | Oh | G06F 3/0625 |
| 2020/0150894 A1* | 5/2020 | Lee | G11C 11/5671 |
| 2021/0326269 A1 | 10/2021 | Tarin | |
| 2022/0109713 A1 | 4/2022 | Huang et al. | |
| 2022/0261363 A1 | 8/2022 | Confalonieri et al. | |

(Continued)

FOREIGN PATENT DOCUMENTS

WO  2020263024 A1  12/2020

*Primary Examiner* — Christopher B Shin
(74) *Attorney, Agent, or Firm* — Wolf, Greenfield & Sacks, P.C.

(57) ABSTRACT

Disclosed is a system which includes a first memory device that stores a first data set, and a compute express link (CXL) switch that arbitrates communication of a first host device and a second host device with the first memory device based on a CXL interface. The first memory device receives a first data request and a second data request from the first and second host devices, respectively, through the CXL switch, obtains first directory information and second directory information from the first and second host devices through the CXL switch, generates first encoding data based on the first and second directory information, and outputs the first encoding data to each of the first and second host devices through the CXL switch in response to the first and second data requests.

20 Claims, 17 Drawing Sheets

(56) References Cited

U.S. PATENT DOCUMENTS

2023/0325323 A1   10/2023  Bhushan et al.
2024/0020195 A1*   1/2024  Cross .................. G06F 11/1048
2024/0248608 A1*   7/2024  Kim ........................ G06F 3/067
2025/0251871 A1*   8/2025  Kim ...................... G06F 3/0644

* cited by examiner

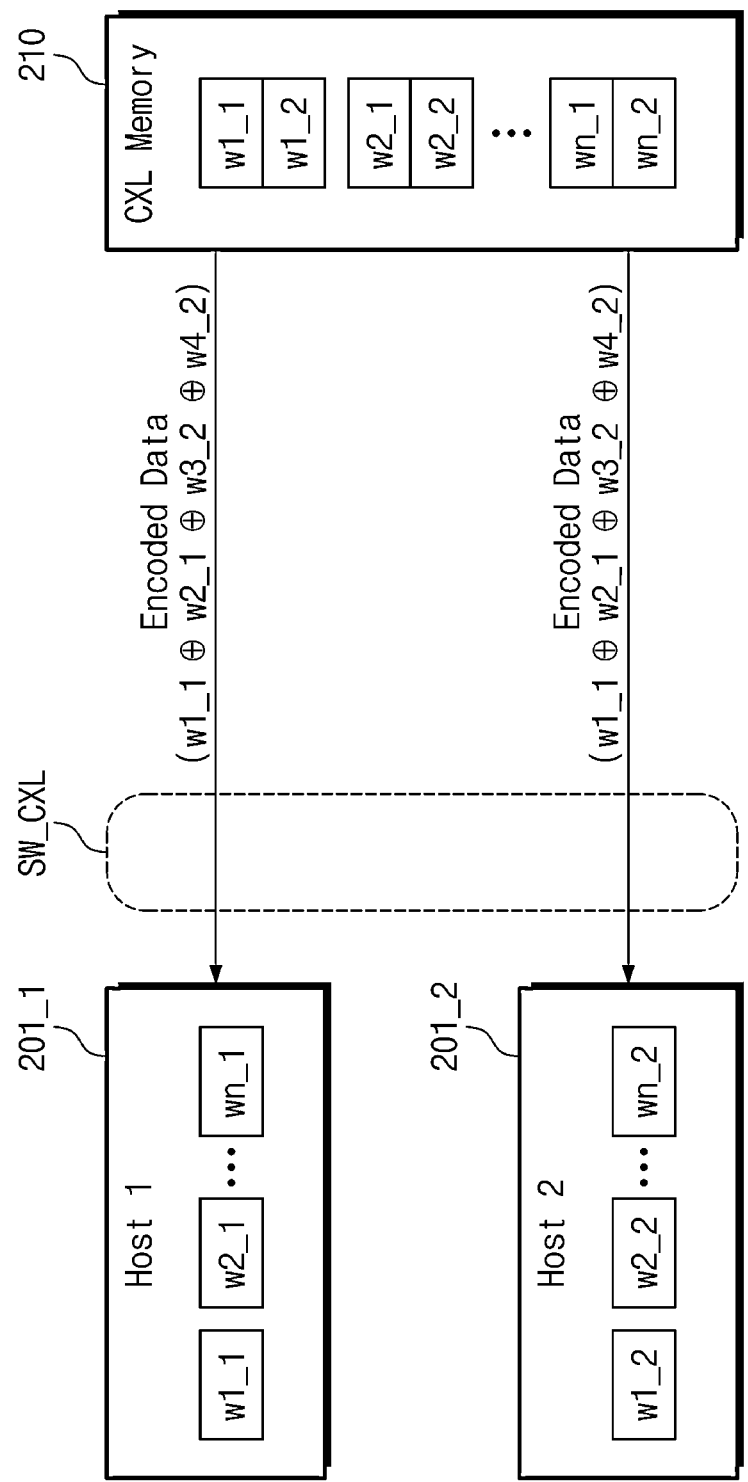

MEMORY DEVICE AND COMPUTING SYSTEM INCLUDING MEMORY DEVICE

CROSS-REFERENCE TO RELATED APPLICATIONS

This application claims priority under 35 U.S.C. § 119 to Korean Patent Application No. 10-2024-0023782 filed on Feb. 19, 2024, in the Korean Intellectual Property Office, the disclosures of which are incorporated by reference herein in their entireties.

BACKGROUND

Embodiments of the present disclosure described herein relate to a semiconductor memory, and more particularly, relate to a computing system including a memory device.

A semiconductor memory is classified as a volatile memory device, which loses stored data when a power supply is cut off, such as a dynamic random access memory (DRAM) or a static RAM (SRAM), or a non-volatile memory device, which retains stored data even when the power supply is cut off, such as a flash memory device, a phase-change RAM (PRAM), a magnetic RAM (MRAM) or a resistive RAM (RRAM).

In a computing system in which a plurality of host devices share a memory device, when each of the plurality of host devices requests data from the memory device, the memory device sequentially transmits the data corresponding to the requests to the plurality of host devices. This data transmission method has an issue in that efficiency of data transmission decreases as the number of host devices sharing the memory device increases. Accordingly, in a computing system in which a plurality of host devices share a memory device, a method for improving data transmission efficiency may be needed.

SUMMARY

Embodiments of the present disclosure provide a memory device which uses a data transmission method for increasing data transmission efficiency and a computing system including the memory device.

According to some embodiments, a system includes a first memory device that stores a first data set, and a compute express link (CXL) switch that arbitrates communication of a first host device and a second host device with the first memory device based on a CXL interface. The first memory device is configured to receive a first data request from the first host device through the CXL switch, receive a second data request from the second host device through the CXL switch, obtain first directory information associated with at least one data stored in the first host device from the first host device through the CXL switch, obtain second directory information associated with at least one data stored in the second host device from the second host through the CXL switch, generate first encoding data based on the first directory information and the second directory information, and output the first encoding data to the first host device and the second host device through the CXL switch in response to the first data request and the second data request.

According to some embodiments, a system includes a first memory device that stores a plurality of data, and a fabric manager that arbitrates communication of a first host device and a second host device with the first memory device based on a compute express link (CXL) interface. The fabric manager receives a first data request from the first host device, receives a second data request from the second host device, obtains first directory information associated with at least one data stored in the first host device from the first host device, obtains second directory information associated with at least one data stored in the second host device from the second host device, generates a third data request based on the first directory information and the second directory information, and transmits the third data request to the first memory device. The first memory device generates first encoding data in response to the third data request and transmits the first encoding data to the fabric manager. The fabric manager further outputs the first encoding data received from the first memory device to the first and second host devices in response to the first data request and the second data request, respectively.

According to some embodiments, a system includes a first host device and a second host device, a first memory device that stores a plurality of data, and a compute express link (CXL) switch that arbitrates communication of the first and second host devices with the first memory device based on a CXL interface. The first host device transmits a first data request to the first memory device through the CXL switch and the second host device transmits a second data request to the first memory device through the CXL switch, and after receiving the first and second data requests, the first memory device obtains first directory information associated with at least one data stored in the first host device from the first host device through the CXL switch, obtains second directory information associated with at least one data stored in the second host device from the second host device through the CXL switch, generates first encoding data based on the first directory information and the second directory information, and outputs the first encoding data to each of the first and second host devices through the CXL switch in response to the first and second data requests.

BRIEF DESCRIPTION OF THE DRAWINGS

The above and other objects and features of the present disclosure will become apparent by describing in detail embodiments thereof with reference to the accompanying drawings.

FIG. 7A, FIG. 7B, and FIG. 7C are diagrams explaining operations of the computing system of FIG. 4.

DETAILED DESCRIPTION

Figure 1:
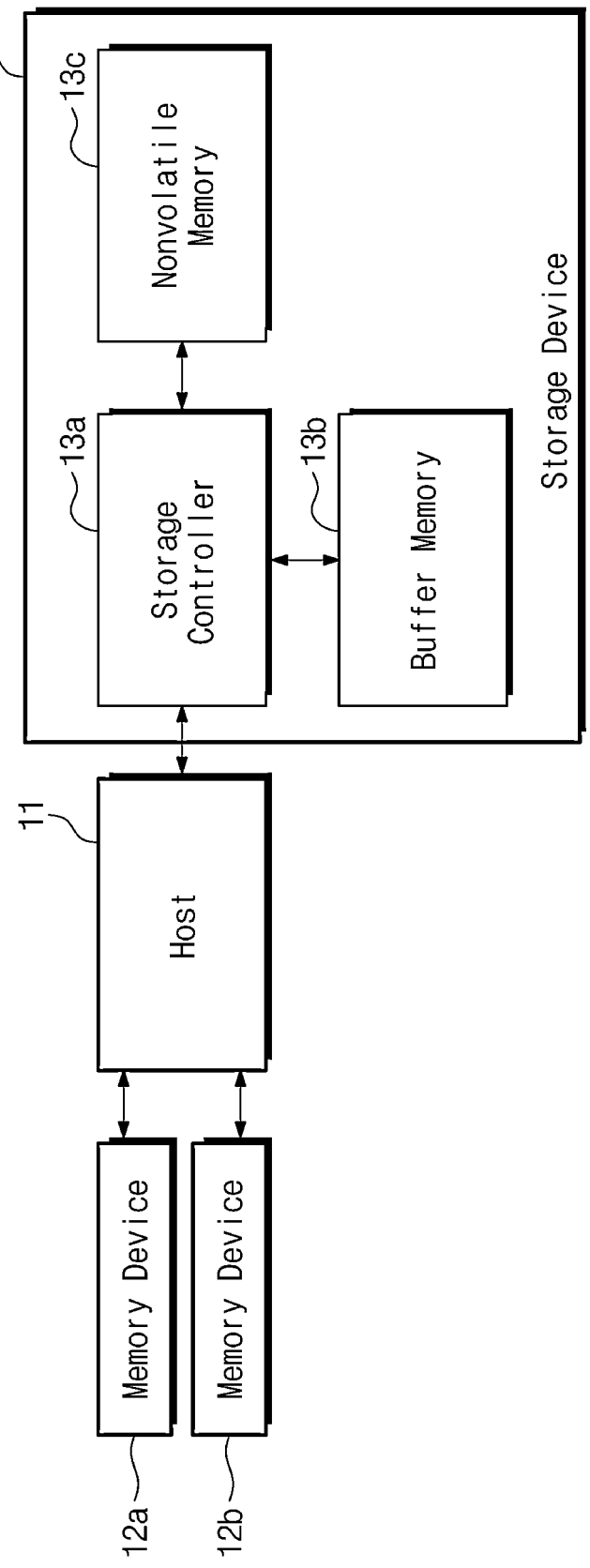
FIG. 1 is a block diagram illustrating a computing system including a storage device.

Hereinafter, embodiments of the present disclosure will be described clearly and in detail so that a person skilled in the technical field of the present disclosure may easily practice the embodiments of the present disclosure.

Components described with reference to terms such as "part or unit", "module", "block", and "~or/~er" used in the detailed description and functional blocks illustrated in the drawing may be implemented in the form of software, hardware, or a combination thereof. Illustratively, the software may be machine code, firmware, embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

FIG. 1 is a block diagram illustrating a computing system 10 including a storage device 13. Referring to FIG. 1, the computing system 10 may include a host 11, a plurality of memory devices 12a and 12b, and the storage device 13. The host 11 may be external to the storage device 13 and may control overall operations of the computing system 10. The plurality of memory devices 12a and 12b may be used as an operating memory or a system memory of the host 11.

The storage device 13 may include a storage controller 13a, a buffer memory 13b, and a nonvolatile memory 13c. The storage controller 13a may store data in the nonvolatile memory 13c or transmit data stored in the nonvolatile memory 13c to the host 11 under control of the host 11.

The buffer memory 13b may store various information necessary for the storage device 13 to operate. For example, the storage controller 13a may manage data stored in the nonvolatile memory 13c by using map data. The map data may include information about a relation between a logical block address managed by the host 11 and a physical block address of the nonvolatile memory 13c.

In some embodiments, the buffer memory 13b may be a high-speed memory such as a DRAM.

Figure 2:
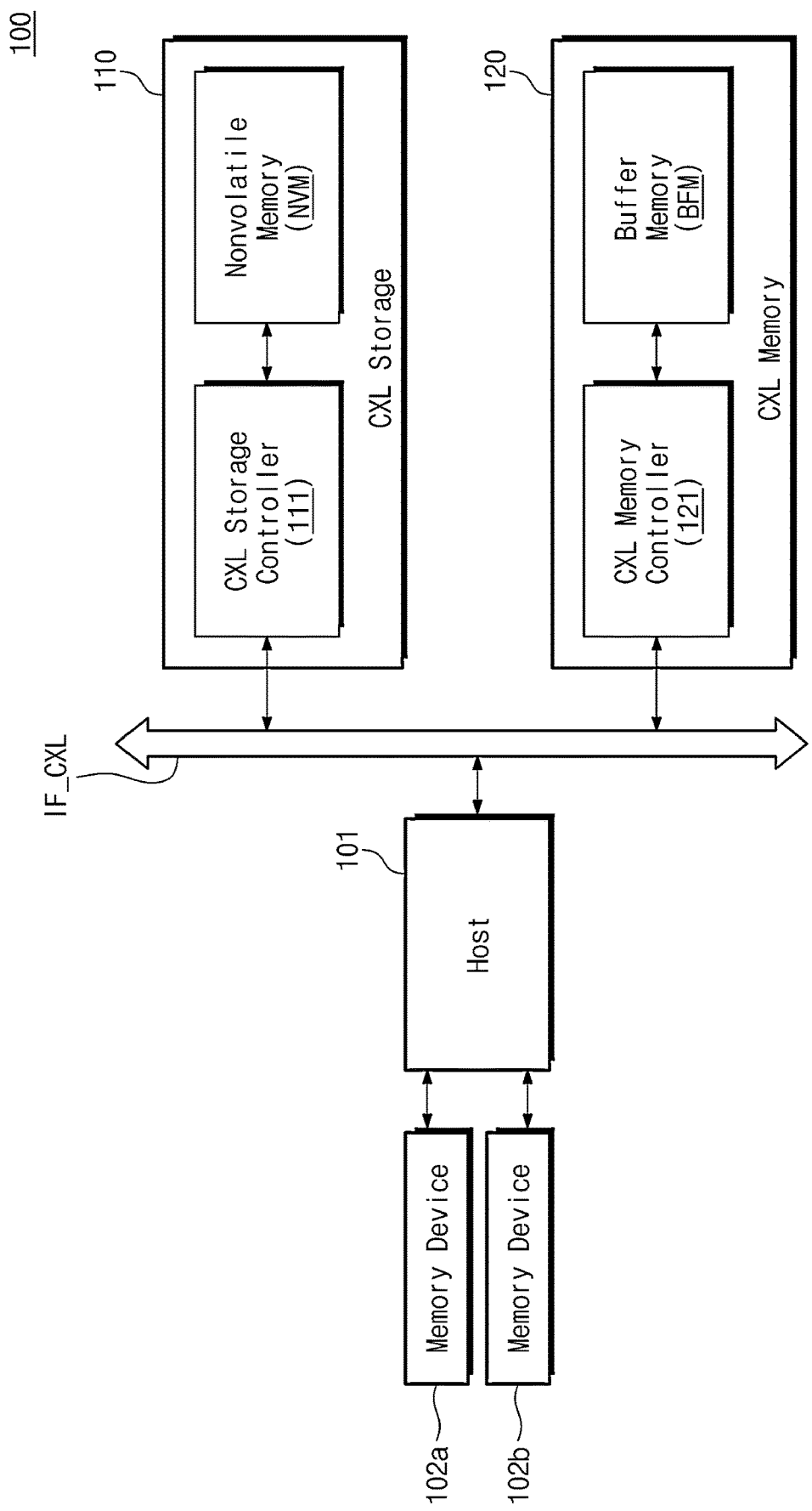
FIG. 2 is a block diagram illustrating a computing system to which a storage system is applied according to some embodiments of the present disclosure.

FIG. 2 is a block diagram illustrating a computing system 100 to which a storage system according to some embodiments of the present disclosure is applied. Referring to FIG. 2, the computing system 100 may include a host 101, a plurality of memory devices 102a and 102b, a compute express link (CXL) storage 110, and a CXL memory 120. In some embodiments, the computing system 100 may be included in a user device such as a personal computer, a laptop computer, a server, a media player, a digital camera, or an automotive device such as a navigation, a black box, or an automotive electrical equipment. In some embodiments, the computing system 100 may be a mobile system such as a portable communication terminal (mobile phone), a smart phone, a tablet personal computer, a wearable device, a health care device, or internet of things (IOT).

The host 101 may control overall operations of the computing system 100. In some embodiments, the host 101 may be one of various processors such as a central processing unit (CPU), a graphics processing unit (GPU), a neural processing unit (NPU), or a data processing unit (DPU). In some embodiments, the host 101 may include a single core processor or a multi-core processor.

The plurality of memory devices 102a and 102b may be used as a main memory or a system memory of the computing system 100. In some embodiments, each of the plurality of memory devices 102a and 102b may be a DRAM device and may include a form factor of a dual in-line memory module (DIMM). However, the scope of the present disclosure is not limited thereto, and the plurality of memory devices 102a and 102b may include a nonvolatile memory device such as a flash memory device, a phase-change RAM (PRAM), a resistive RAM (RRAM), a magnetic RAM (MRAM).

The plurality of memory devices 102a and 102b may communicate directly with the host 101 through a double data rate (DDR) interface. In some embodiments, the host 101 may include a memory controller configured to control the plurality of memory devices 102a and 102b. However, the scope of the present disclosure is not limited thereto, and the plurality of memory devices 102a and 102b may communicate with the host 101 through various interfaces.

The CXL storage 110 may include a CXL storage controller 111 and a nonvolatile memory NVM. The CXL storage controller 111 may store data in the nonvolatile memory NVM or may transmit data stored in the nonvolatile memory NVM to the host 101 under control of the host 101. In some embodiments, the nonvolatile memory NVM may be a NAND flash memory, but the scope of the present disclosure is not limited thereto.

The CXL memory 120 may include a CXL memory controller 121 and a buffer memory BFM. The CXL memory controller 121 may store data in the buffer memory BFM or may transmit data stored in the buffer memory BFM to the host 101. In some embodiments, the buffer memory BFM may be the DRAM, but the scope of the present disclosure is not limited thereto.

In some embodiments, the host 101, the CXL storage 110, and the CXL memory 120 may be configured to share the same interface with each other. For example, the host 101, the CXL storage 110, and the CXL memory 120 may communicate with each other through a CXL interface IF_CXL. In some embodiments, the CXL interface IF_CXL may indicate a low-latency and high-bandwidth link which enables various connections between accelerators, memory devices, or various electronic devices by supporting a coherency, a memory access, and a dynamic protocol muxing of an input/output protocol (I/O protocol).

In some embodiments, the CXL storage 110 may access the CXL memory 120 through the CXL interface IF_CXL. The CXL memory 120 may store data in the buffer memory BFM or may transmit data stored in the buffer memory BFM to the CXL storage 110 under control of the CXL storage 110.

In some embodiments, the storage controller 13a of the conventional storage device 13 may communicate with the host 11 through a host interface such as a peripheral component interconnect express (PCIe) or a nonvolatile memory express (NVMe), and may communicate with the buffer memory 13b through a memory interface such as the DDR or a low-power double data rate (LPDDR) interface. That is, the storage controller 13a of the conventional storage device 13 may communicate with the host 11 that is external and with the buffer memory 13b that is internal to the storage device through interfaces different from each other (i.e., heterogeneous interfaces), respectively.

On the other hand, according to some embodiments of the present disclosure, the CXL storage controller 111 of the CXL storage 110 may communicate with the host 101 and the CXL memory 120 (i.e., a buffer memory) through the CXL interface IF_CXL. In other words, the CXL storage controller 111 of the CXL storage 110 may communicate with the host 101 and the CXL memory 120 through a homogenous interface or a common interface.

Hereinafter, for convenience of description, it is assumed that the host 101, the CXL storage 110, and the CXL memory 120 may communicate with each other through the CXL interface IF_CXL. However, the scope of the present disclosure is not limited thereto, and the host 101, the CXL storage 110, and the CXL memory 120 may communicate with each other based on various computing interfaces such as a GEN-Z protocol, a NVLink protocol, a CCIX protocol, an OPEN CAPI (Coherent Accelerator Processor Interface) protocol.

Figure 3:
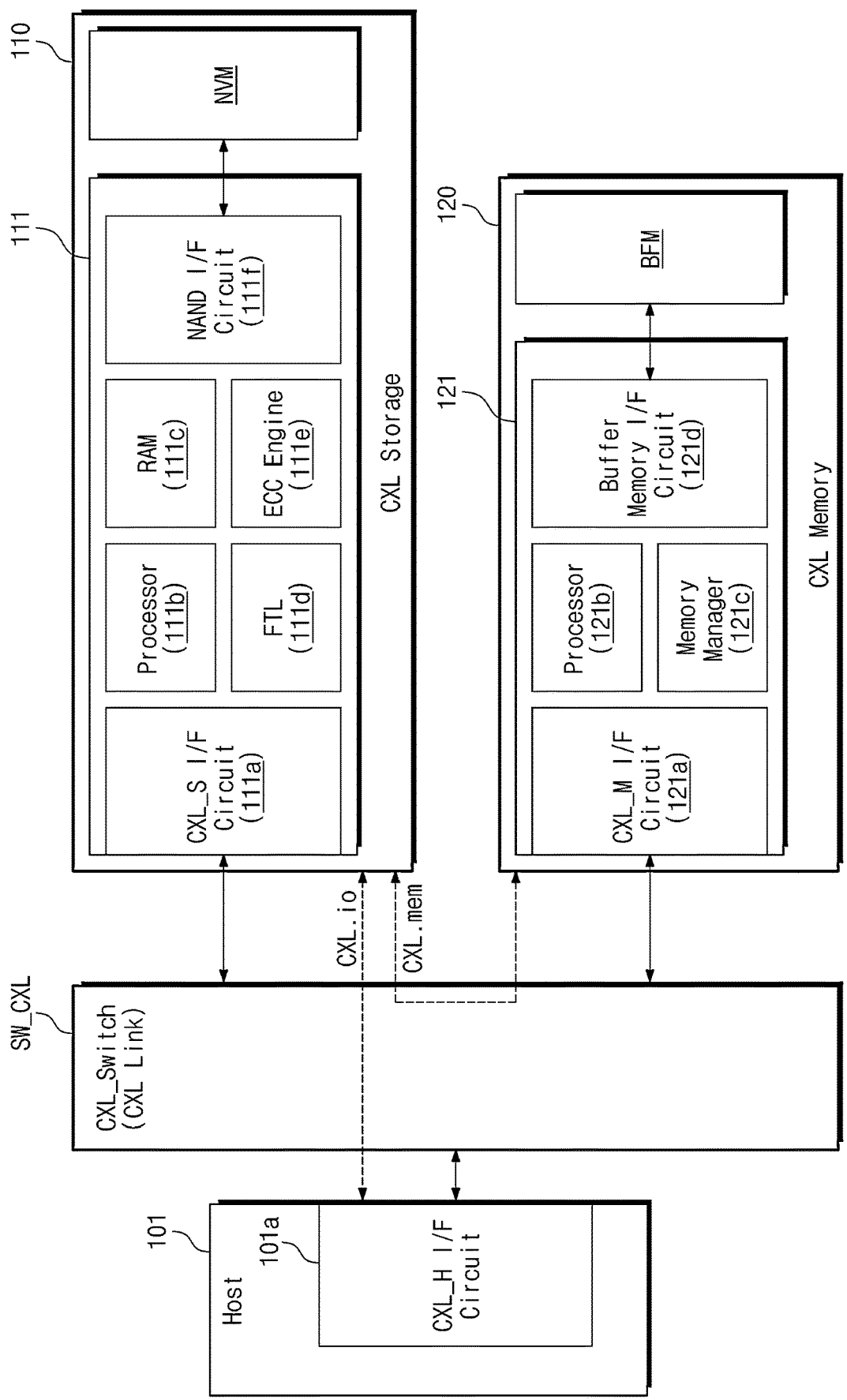
FIG. 3 is a block diagram illustrating components of the computing system of FIG. 2 in more detail.

FIG. 3 is a block diagram illustrating components of the computing system of FIG. 2 in more detail. Referring to FIG. 2 and FIG. 3, the computing system 100 may include a CXL switch SW_CXL, the host 101, the CXL storage 110, and the CXL memory 120.

The CXL switch SW_CXL may be a component included in the CXL interface IF_CXL. The CXL switch SW_CXL may be configured to arbitrate communication between the host 101, the CXL storage 110, and the CXL memory 120. For example, when the host 101 and the CXL storage 110 communicate with each other, the CXL switch SW_CXL may be configured to provide the CXL storage 110 or the host 101 with information such as a request, data, a response, and/or a signal transmitted from the host 101 or the CXL storage 110. When the host 101 and the CXL memory 120 communicate with each other, the CXL switch SW_CXL may be configured to provide the host 101 or the CXL memory 120 with information such as a request, data, a response, and/or a signal transmitted from the host 101 or the CXL memory 120. When the CXL storage 110 and the CXL memory 120 communicate with each other, the CXL switch SW_CXL may be configured to provide the CXL storage 110 or the CXL memory 120 with information such as a request, data, a response, and/or a signal transmitted from the CXL storage 110 or the CXL memory 120.

The host 101 may include a CXL host interface circuit 101a. The CXL host interface circuit 101a may communicate with the CXL storage 110 or the CXL memory 120 through the CXL switch SW_CXL.

The CXL storage 110 may include the CXL storage controller 111 and the nonvolatile memory NVM. The CXL storage controller 111 may include a CXL storage interface circuit 111a, a processor 111b, a RAM 111c, a flash translation layer (FTL) 111d, an error correction code (ECC) engine 111e, and a NAND interface circuit 111f.

The CXL storage interface circuit 111a may be connected to the CXL switch SW_CXL. The CXL storage interface circuit 111a may communicate with a host 101 or the CXL memory 120.

The processor 111b may be configured to control overall operations of the CXL storage controller 111. The RAM 111c may be used as an operating memory or a buffer memory of the CXL storage controller 111. In some embodiments, the RAM 111c may be a SRAM and may be used as a read buffer, a write buffer, and/or the like.

The FTL 111d may perform various management operations for using the nonvolatile memory NVM efficiently. For example, the FTL 111d may perform an address translation between a logical block address managed by the host 101 and a physical block address used in the nonvolatile memory NVM based on the map data (or a mapping table). The FTL 111d may perform a bad block management operation in association with the nonvolatile memory NVM. The FTL 111d may perform a wear leveling operation in association with the nonvolatile memory NVM. The FTL 111d may perform a garbage collection operation in association with the nonvolatile memory NVM.

In some embodiments, the FTL 111d may be implemented based on software, hardware, firmware, or a combination thereof. When the FTL 111d is implemented in a form of software or firmware, program codes related to the FTL 111d may be stored in the RAM 111c and may be driven by the processor 111b. When the FTL 111d is implemented in hardware, hardware components configured to perform various management operations described above may be implemented in the CXL storage controller 111.

The ECC engine 111e may perform an error detection and correction on data stored in the nonvolatile memory NVM. For example, the ECC engine 111e may generate parity bits in association with data to be stored in the nonvolatile memory NVM, and the generated parity bits may be stored in the nonvolatile memory NVM along with data. When the data is read from the nonvolatile memory NVM, the ECC engine 111e may detect and correct an error in the data by using the parity bits read from nonvolatile memory NVM along with the data.

The NAND interface circuit 111f may control the nonvolatile memory NVM so that data is stored in or read from the nonvolatile memory NVM. In some embodiments, the NAND interface circuit 111f may be implemented to comply with a standard protocol such as a Toggle Interface or an open NAND flash interface (ONFI). For example, the nonvolatile memory NVM may include a plurality of NAND flash devices, and when the NAND interface circuit 111f is implemented based on the Toggle Interface, the NAND interface circuit 111f communicates with the plurality of NAND flash devices through a plurality of channels. The plurality of NAND flash devices may be connected to the plurality of channels through a multi-channel multi-way structure.

The NAND interface circuit 111f may transmit a chip enable signal/CE, a command latch enable signal CLE, an address latch enable signal ALE, a read enable signal/RE, and a write enable signal/WE to each of the plurality of NAND flash devices through each of the plurality of channels. The NAND interface circuit 111f and each of the plurality of NAND flash devices may exchange a data signal DQx and a data strobe signal DQS through each of the plurality of channels.

TABLE 1

| /CE | CLE | ALE | /WE | /RE | DQS | DQx | MODE |
|-----|-----|-----|-----|-----|-----|-----|------|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

Table 1 illustrates an operation mode of the NAND flash device according to a state of each signal. Referring to Table 1, while the NAND flash device receives a command CMD or an address ADDR or a data in Data_in or a data out DATA_out, the chip enable signal/CE maintains a state of a low level L. During a command input mode Command Input, the NAND interface circuit 111f may control signal lines so that the command latch enable signal CLE is at a high level H, the address latch enable signal ALE is at the low level L, the write enable signal/WE toggles between the high level H and the low level L, and the read enable signal/RE is at the high level H. During the command input mode Command Input, the NAND interface circuit 111*f* may transmit the command CMD to the NAND flash device through the data signal DQx in synchronization with a rising edge ↑ of the write enable signal/WE. The NAND flash device may identify the command CMD from the data signal DQx in response to the rising edge ↑ of the write enable signal/WE.

During the address input mode Address Input, the NAND interface circuit 111*f* may control signal lines so that the command latch enable signal CLE is at the low level L, the address latch enable signal ALE is at the high level H, the write enable signal/WE toggles between the high level H and the low level L, and the read enable signal/RE is at the high level H. During the address input mode Address Input, the NAND interface circuit 111*f* may transmit the address ADDR to the NAND flash device through the data signal DQx in synchronization with the rising edge ↑ of the write enable signal/WE. The NAND flash device may identify the address ADDR from the data signal DQx in response to the rising edge ↑ of the write enable signal/WE. In some embodiments, the address ADDR may be a value corresponding to a physical block address of the NAND flash device.

During the input data mode Data Input, the NAND interface circuit 111*f* may control signal lines so that the command latch enable signal CLE is at the low level L, the address latch enable signal ALE is at the low level L, the write enable signal/WE is at the high level H, the read enable signal/RE is at the high level H, and the data strobe signal DQS toggles between the high level H and the low level L. During the input data mode Data Input, the NAND interface circuit 111*f* may transmit data DATA to the NAND flash device through the data signal DQx in synchronization with the rising edge ↑ and a falling edge ↓ of the data strobe signal DQS. The NAND flash device may identify the data DATA from the data signal DQx in response to the rising edge ↑ and the falling edge ↓ of the data strobe signal DQS.

During the output data mode Data Output, the NAND interface circuit 111*f* may control signal lines so that the command latch enable signal CLE is at the low level L, the address latch enable signal ALE is at the low level L, the write enable signal/WE is at the high level H, and the read enable signal/RE toggles between the high level H and the low level L. During the output data mode Data Output, the NAND flash device may generate the data strobe signal DQS which toggles between the high level H and the low level L in response to the read enable signal/RE. The NAND flash device may transmit the data DATA to the NAND interface circuit 111*f* through the data signal DQx in synchronization with the rising edge ↑ and the falling edge ↓ of the data strobe signal DQS. The NAND interface circuit 111*f* may identify the data DATA from the data signal DQx in response to the rising edge ↑ and the falling edge ← of the data strobe signal DQS.

The toggle interface described above is illustrative, and the scope of the present disclosure is not limited thereto.

The nonvolatile memory NVM may store or may output data under control of the CXL storage controller 111.

The CXL memory 120 may include the CXL memory controller 121 and the buffer memory BFM. The CXL memory controller 121 may include a CXL memory interface circuit 121*a*, a processor 121*b*, a memory manager 121*c*, and a buffer memory interface circuit 121*d*.

The CXL memory interface circuit 121*a* may be connected to the CXL switch SW_CXL. The CXL memory interface circuit 121*a* may communicate with the host 101 or the CXL storage 110 through the CXL switch SW_CXL.

The processor 121*b* may be configured to control overall operations of the CXL memory controller 121. The memory manager 121*c* may be configured to manage the buffer memory BFM. For example, the memory manager 121*c* may be configured to convert a memory address (e.g., a logical address or a virtual address) accessed from the host 101 or the CXL storage 110 into a physical address for the buffer memory BFM. In some embodiments, the memory address may be an address for managing a storage area of the CXL memory 120, and may be a logical address or a virtual address designated and managed by the host 101.

The buffer memory interface circuit 121*d* may control the buffer memory BFM to store data in the buffer memory BFM or to read data from the buffer memory BFM. In some embodiments, the buffer memory interface circuit 121*d* may be implemented to comply with standard protocols such as the DDR interface and the LPDDR.

The buffer memory BFM may store data or may output stored data under control of the CXL memory controller 121.

In some embodiments, the host 101 and the CXL storage 110 may communicate with each other by using a CXL.io which is an input/output protocol. The CXL.io may include a PCIe-based non-consistent input/output protocol. The host 101 and the CXL storage 110 may exchange user data or various information with each other by using the CXL.io.

In some embodiments, the CXL storage 110 and the CXL memory 120 may communicate with each other by using a CXL.mem which is a memory access protocol. The CXL.mem may be the memory access protocol which supports accessing a memory. The CXL storage 110 may access a partial area (e.g., an area dedicated to a CXL storage) of the CXL memory 120 by using the CXL.mem.

In some embodiments, the host 101 and the CXL memory 120 may communicate with each other by using the CXL.mem which is the memory access protocol. The host 101 may access a remaining area of the CXL memory 120 (e.g., a remaining area other than a dedicated area for the CXL storage), by using the CXL.mem.

The above-described access types (e.g., the CXL.io, the CXL.mem) are some example protocols, but the scope of the present disclosure is not limited thereto.

In some embodiments, the CXL storage 110 and the CXL memory 120 may be mounted on a physical port (e.g., a PCIe physical port) based on the CXL interface. In some embodiments, the CXL storage 110 and the CXL memory 120 may be implemented based on an E1.S, an E1.L, an E3.S, an E3.L, a PCIe AIC (CEM) form factors. In some embodiments, the CXL storage 110 and the CXL memory 120 may be implemented based on a U.2 form factor, an M.2 form factor, or various other PCIe-based form factors, or various other small form factors. As described below in FIG. 14, the CXL storage 110 and the CXL memory 120 may be implemented in various form factors and may support a hot-plug function which may be mounted or removed from a physical port.

Figure 4:
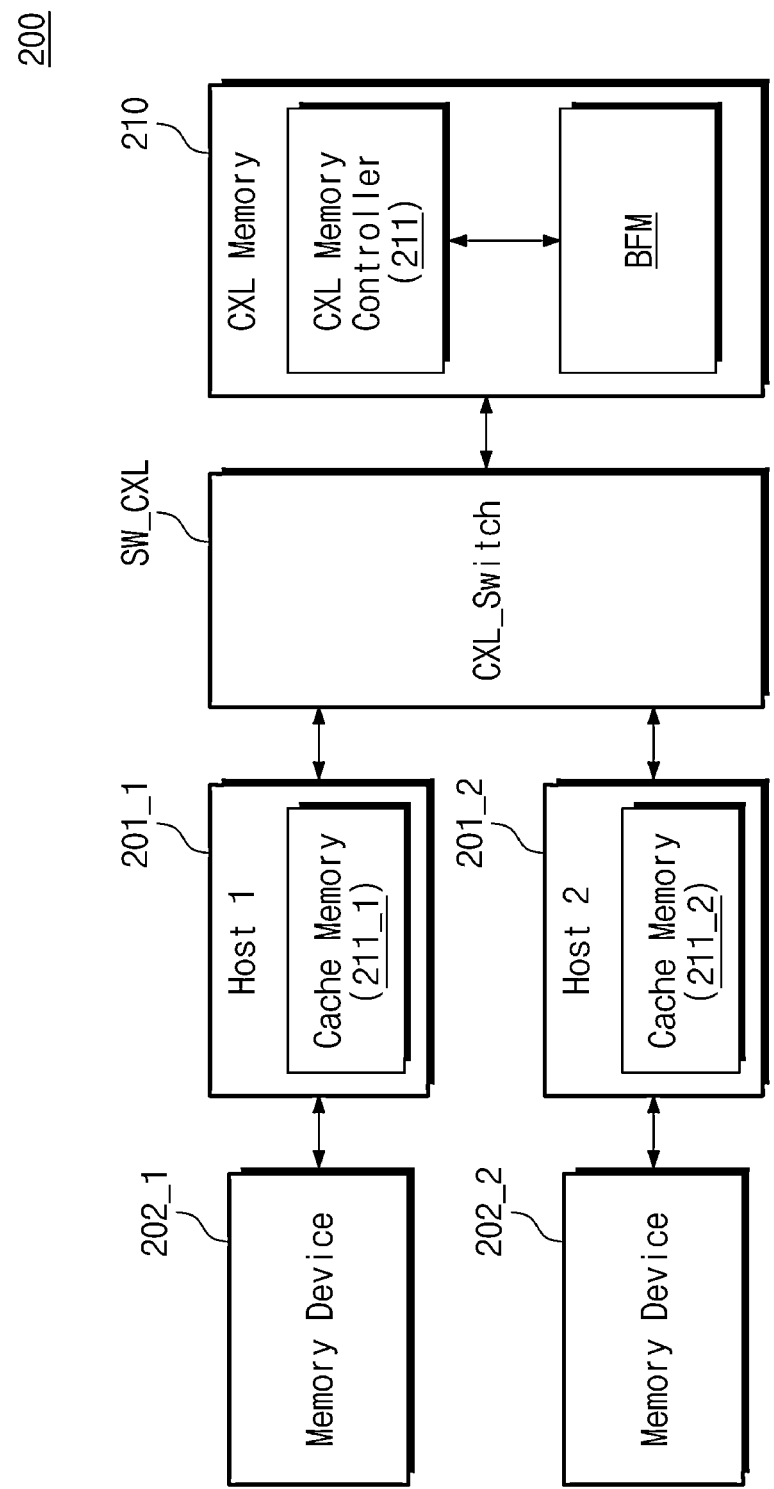
FIG. 4 is a block diagram illustrating a computing system according to some embodiments of the present disclosure.

FIG. 4 is a block diagram illustrating a computing system according to some embodiments of the present disclosure. Hereinafter, for convenience of description, detailed descriptions of overlapping components will be omitted. Referring to FIG. 4, a computing system 200 may include a first host 201_1 and a second host 201_2, a plurality of memory devices 202_1 and 202_2, the CXL switch SW_CXL, and a CXL memory 210.

The first and second hosts 201_1 and 201_2 include cache memories 211_1 and 211_2, respectively, and may store frequently accessed data in the cache memories 211_1 and 211_2, respectively. For example, the first host 201_1 may include the cache memory 211_1 and may store frequently accessed data in the cache memory 211_1. For example, the second host 201_2 may include the cache memory 211_2 and may store frequently accessed data in the cache memory 211_2.

The first and second hosts 201_1 and 201_2 may be directly connected to the plurality of memory devices 202_1 and 202_2, respectively. For example, the first host 201_1 may be directly connected to the memory device 202_1, and the second host 201_2 may be directly connected to the memory device 202_2.

The first and second hosts 201_1 and 201_2 may store frequently accessed data in the memory devices 202_1 and 202_2, respectively. For example, the first host 201_1 may store frequently accessed data in the memory device 202_1, and the second host 201_2 may store frequently accessed data in the memory device 202_2.

In some embodiments, the first and second hosts 201_1 and 201_2 may store data in the cache memories 211_1 and 211_2 or the memory devices 202_1 and 202_2 based on a frequency with which data is accessed.

For example, when the frequency with which data is accessed is greater than or equal to a first threshold value, the first host 201_1 may store data in the cache memory 211_1. When the frequency with which data is accessed is less than or equal to the first threshold value, the first host 201_1 may store data in the memory device 202_1. In some embodiments, when the frequency with which data is accessed is less than or equal to the first threshold value and greater than or equal to a second threshold value, the first host 201_1 may store data in the memory device 202_1.

For example, when the frequency with which data is accessed is greater than or equal to the first threshold value, the second host 201_2 may store data in the cache memory 211_2. When the frequency with which data is accessed is less than or equal to the first threshold value and greater than or equal to the second threshold value, the second host 201_2 may store data in the memory device 202_2. In some embodiments, when the frequency with which data is accessed is less than or equal to the first threshold value and greater than or equal to the second threshold value, the second host 201_2 may store data in the memory device 202_2.

In some embodiments, the threshold values may be values predetermined by the first and second hosts 201_1 and 201_2 based on the frequency with which data is accessed.

The first and second hosts 201_1 and 201_2 and the CXL memory 210 may be connected to the CXL switch SW_CXL, and may communicate with each other through the CXL switch SW_CXL, respectively.

The first and second hosts 201_1 and 201_2 may transmit a data request to the CXL memory 210 through the CXL switch SW_CXL, respectively. For example, the first host 201_1 may transmit a first data request through the CXL switch SW_CXL, and the second host 201_2 may transmit a second data request through the CXL switch SW_CXL.

Each of the first and second hosts 201_1 and 201_2 may receive data corresponding to the data request from the CXL memory 210 through the CXL switch SW_CXL. For example, the first host 201_1 may receive data corresponding to the first data request through the CXL switch SW_CXL, and the second host 201_2 may receive data corresponding to the first data request through the CXL switch SW_CXL.

A CXL memory controller 211 may receive the data requests from the first and second hosts 201_1 and 201_2 through the CXL switch SW_CXL. For example, the CXL memory controller 211 may receive the first data request from the first host 201_1 and the second data request from the second host 201_2 through the CXL switch SW_CXL.

The CXL memory controller 211 may acquire directory information on data stored in the cache memories 211_1 and 211_2 or the memory devices 202_1 and 202_2 through the CXL switch SW_CXL.

For example, after receiving the first data request, the CXL memory controller 211 may acquire first directory information on at least one data stored in the cache memory 211_1 or the memory device 202_1 from the first host 201_1 through the CXL switch SW_CXL.

For example, after receiving the second data request, the CXL memory controller 211 may acquire second directory information on at least one data stored in the cache memory 211_2 or the memory device 202_2 from the second host 201_2 through the CXL switch SW_CXL.

The CXL memory controller 211 may generate encoding data from at least some of a plurality of data stored in the buffer memory BFM, based on directory information. The CXL memory controller 211 may transmit the encoding data to each of the first and second hosts 201_1 and 201_2, through the CXL switch SW_CXL.

For example, the CXL memory controller 211 may identify first data not stored in the cache memory 211_1 or the memory device 202_1 from among a plurality of data associated with the first data request, based on the first directory information. The CXL memory controller 211 may identify second data not stored in the cache memory 211_2 or the memory device 202_2 from among a plurality of data associated with the second data request, based on the second directory information. The CXL memory controller 211 may generate encoding data by performing encoding on the first data and the second data among the plurality of data stored in the buffer memory BFM, and the encoding is based on a logical operation. The CXL memory controller 211 may transmit the encoding data to each of the first and second hosts 201_1 and 201_2 through the CXL switch SW_CXL in response to the first data request and the second data request.

In some embodiments, the CXL memory controller 211 may perform encoding based on an XOR operation to generate encoding data. However, the scope of the present disclosure is not limited thereto, and the CXL memory controller 211 may perform encoding based on various logical operations to generate the encoding data.

In some embodiments, the computing system 200 may include the CXL storage 110 described with reference to FIG. 2 and FIG. 3 instead of the CXL memory 210. In this case, the CXL storage controller 111 of the CXL storage 110 may perform the same operation as the CXL memory controller 211 of FIG. 4.

As described above, in the computing system 200 in which the first and second hosts 201_1 and 201_2 share the CXL memory 210, the CXL memory 210 may output the encoding data to each of the first and second hosts 201_1 and 201_2, in response to data requests from the first and second hosts 201_1 and 201_2. Accordingly, the efficiency of data transmission may be improved.

Figure 5:
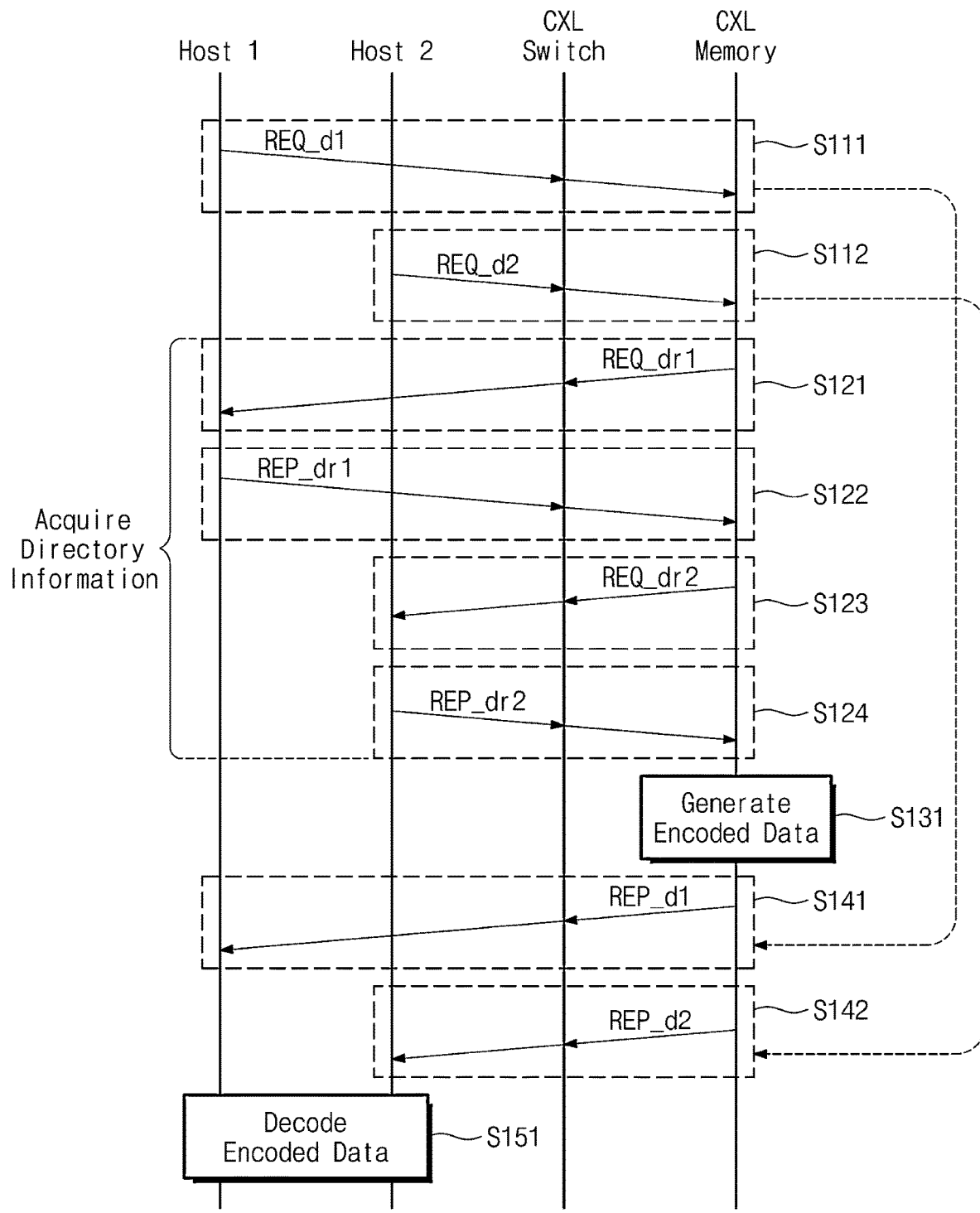
FIG. 5 is a flowchart illustrating data transmission operations of the computing system of FIG. 4.

FIG. 5 is a flowchart illustrating a data transmission operation of the computing system of FIG. 4. Referring to FIG. 4 and FIG. 5, in operation S111, the first host 201_1 may issue a first data request REQ_d1. The first data request REQ_d1 may be transmitted to the CXL switch SW_CXL.

The CXL switch SW_CXL may transmit the first data request REQ_d1 to the CXL memory 210 which is a target of the first data request REQ_d1.

In operation S112, the second host 201_2 may issue a second data request REQ_d2. The second data request REQ_d2 may be transmitted to the CXL switch SW_CXL. The CXL switch SW_CXL may transmit the second data request REQ_d2 to the CXL memory 210 which is a target of the second data request REQ_d2.

In some embodiments, operations of operation S111 and operation S112 may be performed simultaneously.

The CXL memory 210 may obtain directory information on data stored in the cache memories 211_1 and 211_2 or the memory devices 202_1 and 202_2 from the first and second hosts 201_1 and 201_2, through operations in operation S121 to operation S124. For example, in operation S121, the CXL memory 210 may output a first directory information request REQ_dr1 to obtain the first directory information on at least one data stored in the cache memory 211_1 or the memory device 202_1. The first directory information request REQ_dr1 may be transmitted to the CXL switch SW_CXL. The CXL switch SW_CXL may transmit the first directory information request REQ_dr1 to the first host 201_1 which is a target of the first directory information request REQ_dr1.

In operation S122, the first host 201_1 may output a first directory information response REP_dr1 in response to the first directory information request REQ_dr1 received from the CXL switch SW_CXL. The first directory information response REP_dr1 may include the first directory information. The first directory information response REP_dr1 may be transferred to the CXL switch SW_CXL. The CXL switch SW_CXL may deliver the first directory information response REP_dr1 to the CXL memory 210 which is a target of the first directory information response REP_dr1.

In operation S123, the CXL memory 210 may output a second directory information request REQ_dr2 to acquire second directory information about at least one data stored in the cache memory 211_2 or the memory device 202_2. The second directory information request REQ_dr2 may be transmitted to the CXL switch SW_CXL. The CXL switch SW_CXL may transmit the second directory information request REQ_dr2 to the second host 201_2 which is a target of the second directory information request REQ_dr2.

In operation S124, the second host 201_2 may output a second directory information response REP_dr2 in response to the second directory information request REQ_dr2 received from the CXL switch SW_CXL. The second directory information response REP_dr2 may include the second directory information. The second directory information response REP_dr2 may be transferred to the CXL switch SW_CXL. The CXL switch SW_CXL may transfer the second directory information response REP_dr2 to the CXL memory 210 which is a target of the second directory information response REP_dr2.

In some embodiments, operations of operation S121 and operation S123 may be performed simultaneously.

In operation S131, the CXL memory 210 may generate encoding data based on the first and second directory information. For example, the CXL memory 210 may identify the first data not stored in the first host 201_1 (e.g., the cache memory 211_1 or the memory device 202_1) from among the plurality of data associated with the first data request, based on the first directory information. The CXL memory 210 may identify the second data not stored in the second host 201_2 (e.g., the cache memory 211_2 or the memory device 202_2) from among the plurality of data associated with the second data request, based on the second directory information. The CXL memory 210 may generate encoding data by performing encoding based on a first logical operation on the first data and the second data among the plurality of data stored in the buffer memory BFM.

In some embodiments, the first logical operation may be the XOR operation, but the scope of the present disclosure is not limited thereto, and the first logical operation may be one of various logical operations.

The CXL memory 210 may transmit the encoding data to each of the first and second hosts 201_1 and 201_2 in response to the first and second data requests through operations in operation S141 and operation S142. For example, in operation S141, the CXL memory 210 may output a first data response REP_d1 in response to the first data request REQ_d1. The first data response REP_d1 may include the encoding data. The first data response REP_d1 may be transmitted to the CXL switch SW_CXL. The CXL switch SW_CXL may transmit the first data response REP_d1 to the CXL memory 210 which is a target of the first data response REP_d1.

In operation S142, the CXL memory 210 may output a second data response REP_d2 in response to the second data request REQ_d2. The second data response REP_d2 may include the encoding data. The second data response REP_d2 may be transferred to the CXL switch SW_CXL. The CXL switch SW_CXL may transfer the second data response REP_d2 to the CXL memory 210 which is a target of the second data response REP_d2.

In some embodiments, the encoding data in operation S141 and operation S142 may be transmitted in the form of a message.

In some embodiments, the CXL memory 210 may not perform at least one of the operations of operation S141 and operation S142. For example, after transmitting the first data request REQ_d1, the first host 201_1 may perform an operation irrelevant to the first data request REQ_d1. In this case, the first host 201_1 may transmit a data interruption request to the CXL memory 210 through the CXL switch SW_CXL. The CXL memory 210 may not perform the operation of operation S141 in response to the data interruption request received from the CXL switch SW_CXL. But the scope of the present disclosure is not limited thereto. When some of the first and second hosts 201_1 and 201_2 do not receive a data response and the CXL memory 210 recognizes this, the CXL memory 210 may not perform some of the operations of operation $141 and operation S142.

In operation S151, the first and second hosts 201_1 and 201_2 may perform decoding on the encoding data received from the CXL switch SW_CXL. As a result of performing decoding, the first and second hosts 201_1 and 201_2 may acquire necessary data.

For example, the first host 201_1 may perform decoding based on the second logical operation on the encoding data received from the CXL switch SW_CXL. As a result of performing decoding, the first host 201_1 may acquire first data not stored in the first host 201_1 (e.g., the cache memory 211_1 or the memory device 202_1) from among data associated with the first data request. For example, the second host 201_2 may perform decoding based on the second logical operation on the encoding data received from the CXL switch SW_CXL. As a result of performing decoding, the second host 201_2 may acquire second data not stored in the second host 201_2 (e.g., the cache memory 211_2 or the memory device 202_2) from among data associated with the second data request.

In some embodiments, the second logical operation may be the same as the first logical operation described above. For example, the second logical operation may be the XOR operation, but the scope of the present disclosure is not limited thereto, and the second logical operation may be one of various logical operations.

Figure 6A:
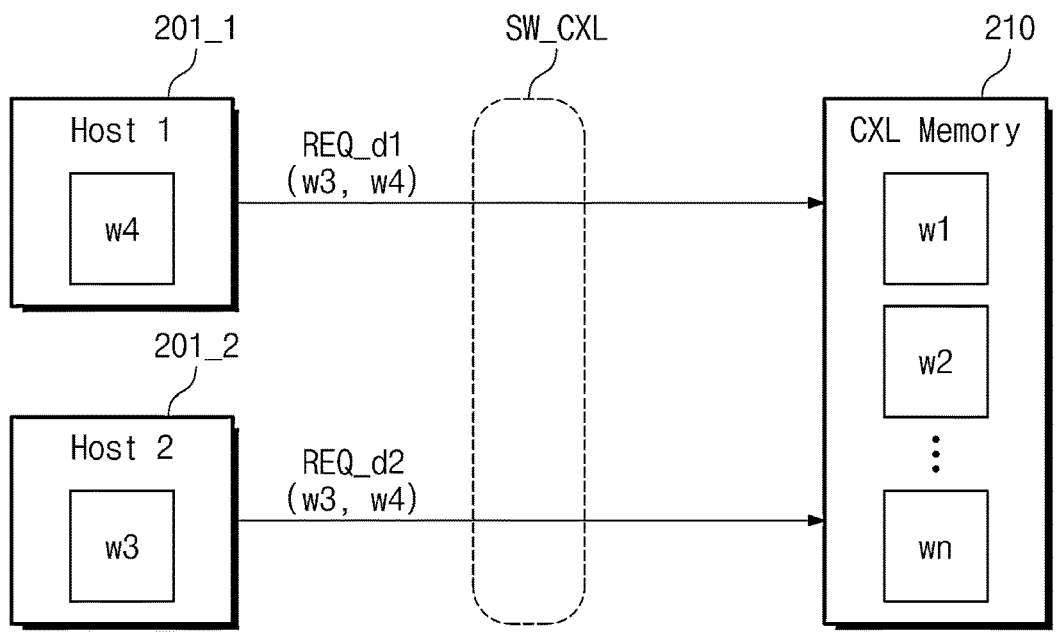
FIG. 6A, FIG. 6B, and FIG. 6C are diagrams explaining operations of the computing system of FIG. 4.
Figure 6B:
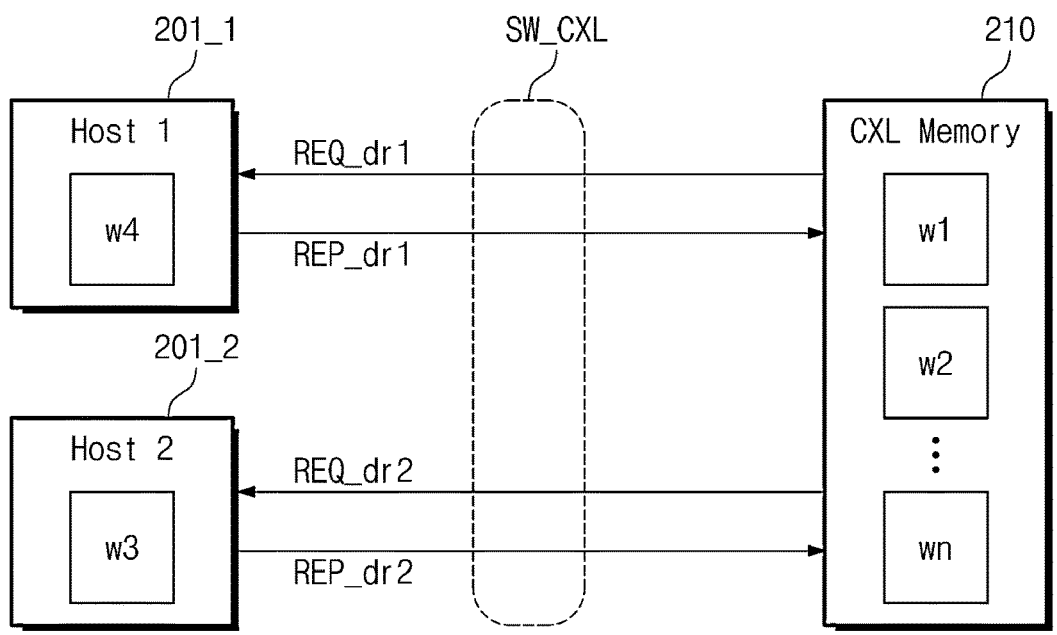
Figure 6C:
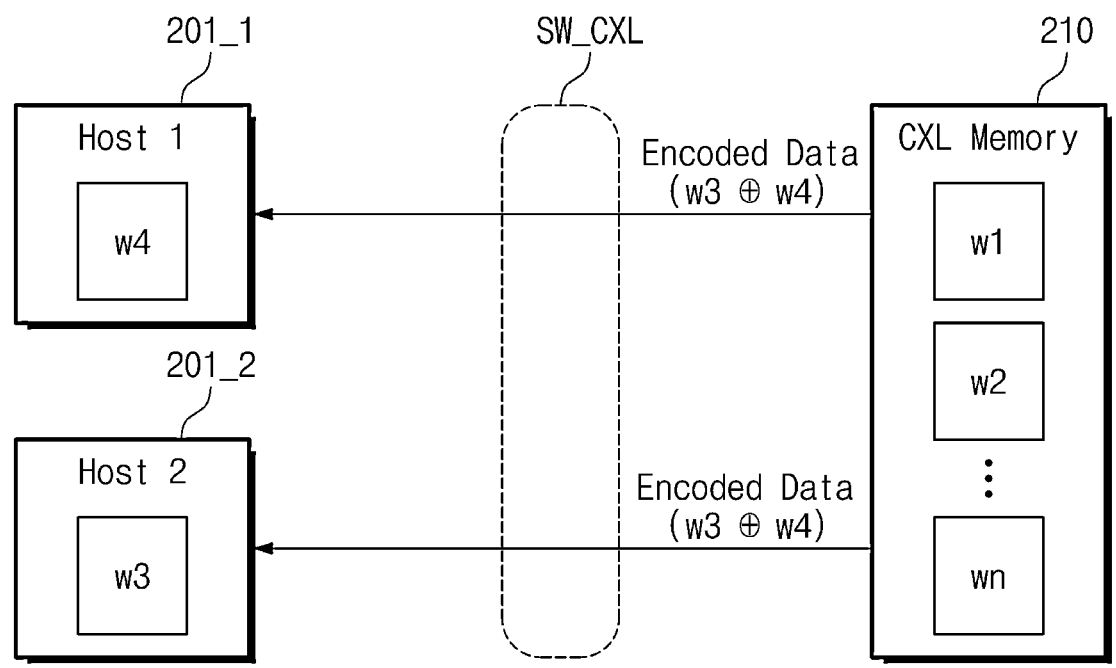

FIG. 6A, FIG. 6B, and FIG. 6C are diagrams explaining the operation of the computing system of FIG. 4. For convenience of description and simplicity of the drawing, components of the first and second hosts 201_1 and 201_2 and the CXL memory 210 are conceptually illustrated, and some unnecessary components are omitted.

In FIG. 6A, FIG. 6B, and FIG. 6C, it is assumed that the first host 201_1 stores data w4, the second host 201_2 stores data w3, and the CXL memory 210 stores a plurality of data w1 to wn.

Referring to FIG. 4, FIG. 5, and FIG. 6A, the first host 201_1 may transmit the first data request REQ_d1 to the CXL memory 210 through the CXL switch SW_CXL, and the second host 201_2 may transmit the second data request REQ_d2 to the CXL memory 210 through the CXL switch SW_CXL. The first data request REQ_d1 and the second data request REQ_d2 may be requests for the data w3 and the data w4. That is, both the first data request REQ_d1 and the second data request REQ_d2 may be related to the data w3 and the data w4.

Referring to FIG. 4, FIG. 5, and FIG. 6A, and FIG. 6B, after receiving the first data request REQ_d1 and the second data request REQ_d2 from the CXL switch SW_CXL, the CXL memory 210 may obtain directory information on data stored in the first and second hosts 201_1 and 201_2.

For example, the CXL memory 210 may transmit the first directory information request REQ_dr1 to the first host 201_1 through the CXL switch SW_CXL to obtain the first directory information in association with the data w4 stored in the first host 201_1. The first host 201_1 may transmit the first directory information response REP_dr1 to the CXL memory 210 through the CXL switch SW_CXL in response to the first directory information request REQ_dr1 received from the CXL switch SW_CXL. The first directory information response REP_dr1 may include first directory information.

For example, the CXL memory 210 may transmit the second directory information request REQ_dr2 to the second host 201_2 through the CXL switch SW_CXL to obtain the second directory information in association with the data w3 stored in the second host 201_2. The second host 201_2 may transmit the second directory information response REP_dr2 to the CXL memory 210 through the CXL switch SW_CXL in response to the second directory information request REQ_dr2 received from the CXL switch SW_CXL. The second directory information response REP_dr2 may include the second directory information.

Referring to FIG. 4, FIG. 5, FIG. 6A, FIG. 6B, and FIG. 6C, the CXL memory 210 may generate encoding data based on the first directory information and the second directory information, and transmit the generated encoding data to each of the first and second hosts 201_1 and 201_2.

For example, the CXL memory 210 may identify first data w3 not stored in the first host 201_1 from among a plurality of data w3 and w4 associated with the first data request REQ_d1, based on the first directory information. In addition, the CXL memory 210 may identify second data w4 not stored in the second host 201_2 from among the plurality of data w3 and w4 associated with the second data request REQ_d2, based on the second directory information. The CXL memory 210 may generate encoding data by performing encoding based on the XOR operation on the identified the first and second data w3 and w4 among the plurality of data w1 to wn stored in the buffer memory BFM. In this case, the encoding data may be an XOR message, with a message form such as $\overline{w3 \oplus w4}$. The CXL memory 210 may transmit the encoding data to each of the first and second hosts 201_1 and 201_2 through the CXL switch SW_CXL in response to the first and second data requests REQ_d1 and REQ_d2.

The first host 201_1 may perform the XOR operation on the received the encoding data and the data w4 stored in the first host 201_1 to perform decoding on the encoding data. As a result of performing decoding, the first host 201_1 may acquire the data w3.

The second host 201_2 may perform the XOR operation on the received the encoding data and the data w3 stored in the second host 201_2 to perform decoding on the encoding data. As a result of performing decoding, the second host 201_2 may acquire the data w4.

In FIG. 6A, FIG. 6B, and FIG. 6C, although the first data request REQ_d1 and the second data request REQ_d2 are illustrated as requests for the same data, the scope of the present disclosure is not limited thereto, and the first data request REQ_d1 and the second data request REQ_d2 may be requests for data different from each other.

Figure 7A:
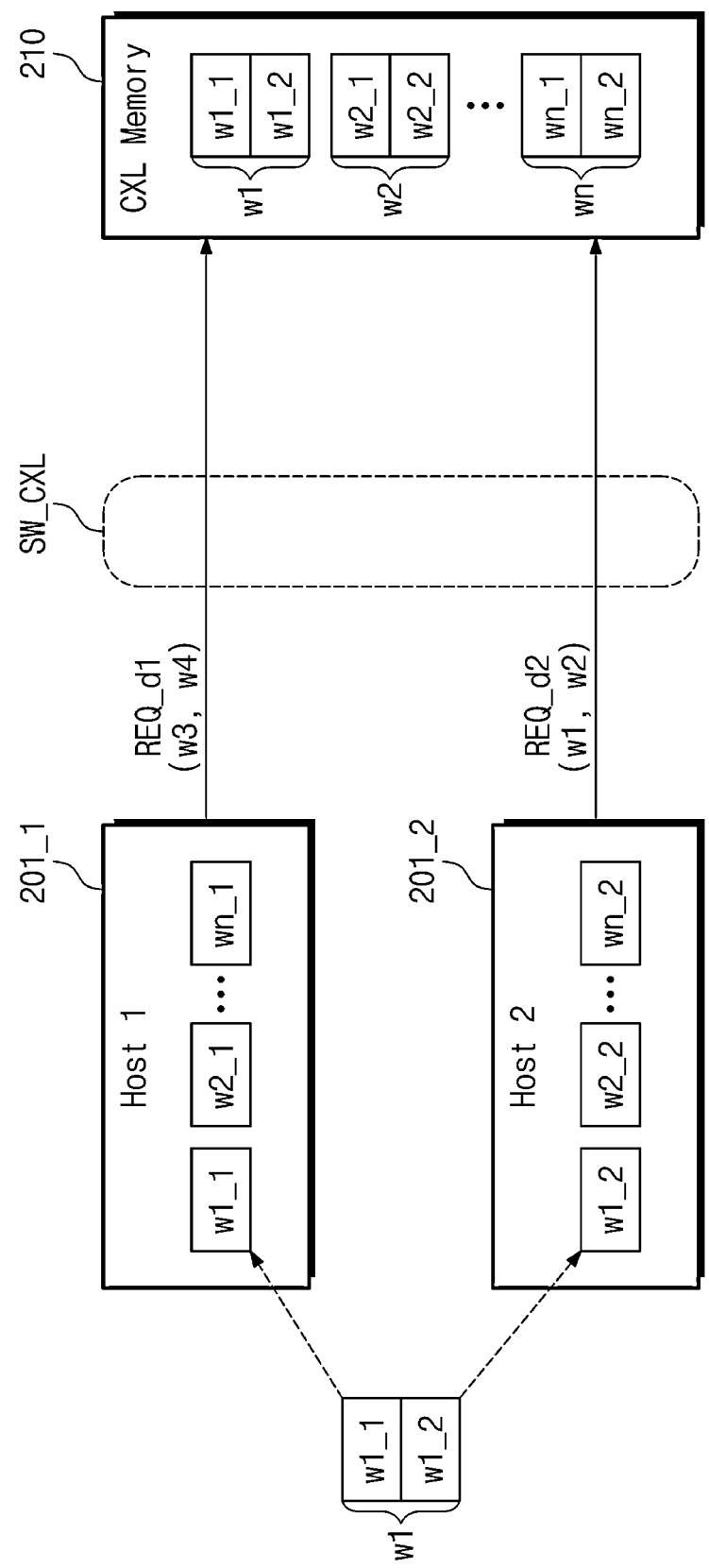
Figure 7B:
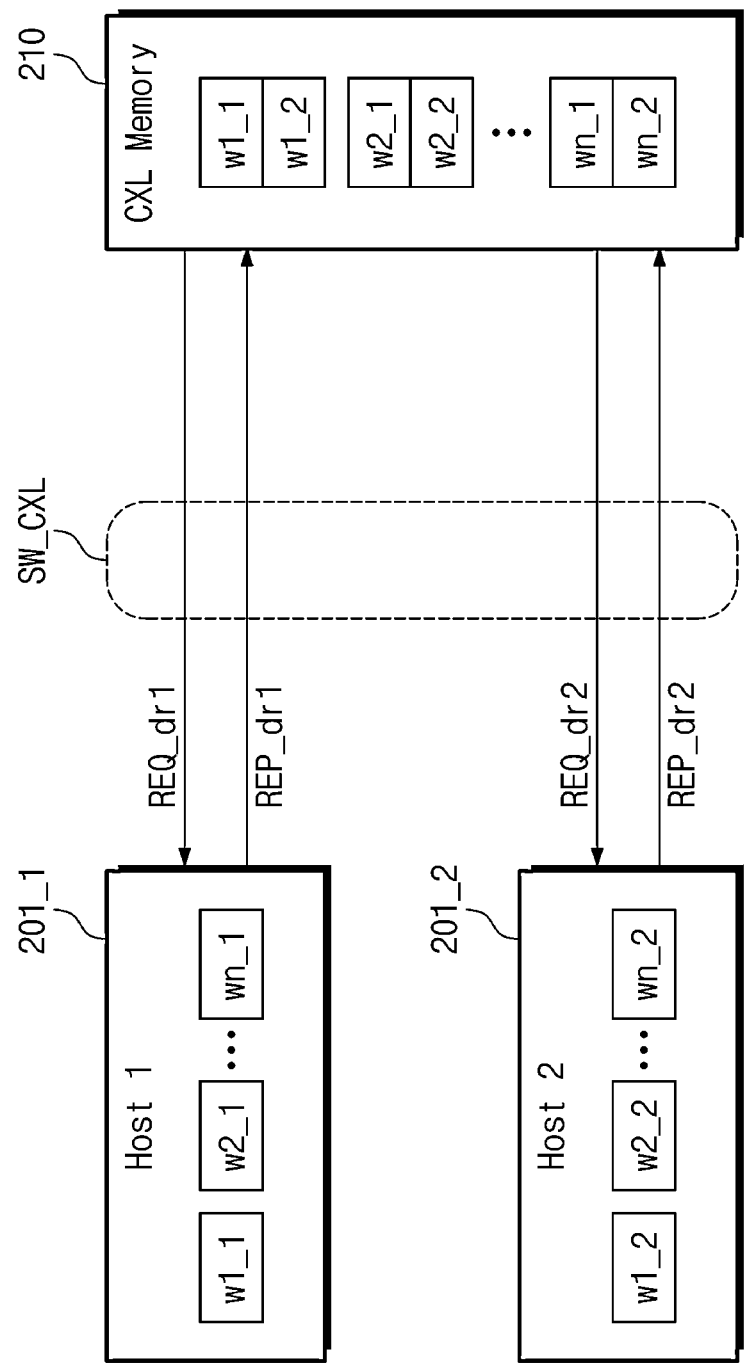

FIG. 7A, FIG. 7B, and FIG. 7C are diagrams for explaining operations of the computing system of FIG. 4. For convenience of description and simplicity of the drawing, components of the first and second hosts 201_1 and 201_2 and the CXL memory 210 are conceptually illustrated, and some unnecessary components are omitted.

In FIG. 7A, FIG. 7B, and FIG. 7C, the plurality of data w1 to wn are divided into first sub-data w1_1 to wn_1 and second sub-data w1_2 to wn_2, the first host 201_1 stores the first sub-data w1_1 to wn_1, the second host 201_2 stores the second sub-data w1_2 to wn_2, and it is assumed that the CXL memory 210 stores the plurality of data w1 to wn.

Referring to FIG. 4, FIG. 5, and FIG. 7A, the first host 201_1 may transmit the first data request REQ_d1 to the CXL memory 210 through the CXL switch SW_CXL, and the second host 201_2 may transmit the second data request REQ_d2 to the CXL memory 210 through the CXL switch SW_CXL. The first data request REQ_d1 may be a request for the data w3 and w4, and the second data request REQ_d2 may be a request for data w1 and w2.

Referring to FIG. 4, FIG. 5, FIG. 7A, and FIG. 7B, after receiving the first data request REQ_d1 and the second data request REQ_d2 from the CXL switch SW_CXL, the CXL memory 210 may obtain directory information on data stored in the first and second hosts 201_1 and 201_2.

For example, the CXL memory 210 may transmit the first directory information request REQ_dr1 to the first host 201_1 through the CXL switch SW_CXL to acquire first directory information in association with the first sub-data w1_1 to wn_1 stored in the first host 201_1. The first host 201_1 may transmit the first directory information response REP_dr1 to the CXL memory 210 through the CXL switch SW_CXL in response to the received first directory information request REQ_dr1. The first directory information response REP_dr1 may include the first directory information.

For example, the CXL memory 210 may transmit the second directory information request REQ_dr2 to the second host 201_2 through the CXL switch SW_CXL to acquire second directory information in association with the second sub-data w1_2 to wn_2 stored in the second host 201_2. The second host 201_2 may transmit the second directory information response REP_dr2 to the CXL memory 210 through the CXL switch SW_CXL in response to the received second directory information request REQ_dr2. The second directory information response REP_dr2 may include the second directory information.

Referring to FIG. 4, FIG. 5, FIG. 7A, FIG. 7B, and FIG. 7C, the CXL memory 210 may generate encoding data based on the first directory information and the second directory information, and may output the generated encoding data to each of the first and second hosts 201_1 and 201_2.

For example, the CXL memory 210 may identify data w3_2 and w4_2 not stored in the first host 201_1 from among the plurality of data w3 and w4 associated with the first data request REQ_d1, based on the first directory information. In addition, the CXL memory 210 may identify data w1_1 and w2_1 not stored in the second host 201_2 from among a plurality of data w1 and w2 associated with the second data request REQ_d2, based on the second directory information. The CXL memory 210 may generate encoding data by performing encoding based on the XOR operation on the identified data w1_1, w2_1, w3_2, and w4_2 among the plurality of data w1 to wn. In this case, the encoding data may have a message form such as $\overline{w1\_1 \oplus w2\_1 \oplus w3\_2 \oplus w4\_2}$. The CXL memory 210 may transmit the encoding data to each of the first and second hosts 201_1 and 201_2 through the CXL switch SW_CXL, in response to the first and second data requests REQ_d1 and REQ_d2.

The first host 201_1 may perform decoding on the encoding data by performing the XOR operation on the received encoding data and the first sub-data w1_1 to wn_1 stored in the first host 201_1. As a result of performing decoding, the first host 201_1 may acquire the data w3_2 and w4_2.

The second host 201_2 may perform decoding on the encoding data by performing the XOR operation on the received encoding data and the second sub-data w1_2 to wn_2 stored in the second host 201_2. As a result of performing decoding, the second host 201_2 may acquire the data w1_1 and w2_1.

In some embodiments, unlike FIG. 7B and FIG. 7C, the CXL memory 210 may generate encoding data based on the first data request REQ_d1 and the second data request REQ_d2 without obtaining the first directory information and the second directory information. For example, according to a predetermined rule, it may be configured that the first host 201_1 stores the first sub-data w1_1 to wn_1, and the second host 201_2 stores the second sub-data w1_2 to wn_2. In this case, the CXL memory 210 may identify the data w3_2 and w4_2 required for the first host 201_1 based on the first data request REQ_d1, and identify the data w1_1 and w2_1 required for the second host 201_2 based on the second data request REQ_d2. The CXL memory 210 may generate encoding data by performing encoding based on the XOR operation on the identified data w1_1, w2_1, w3_2 and w4_2 among the plurality of data w1 to wn.

Figure 8:
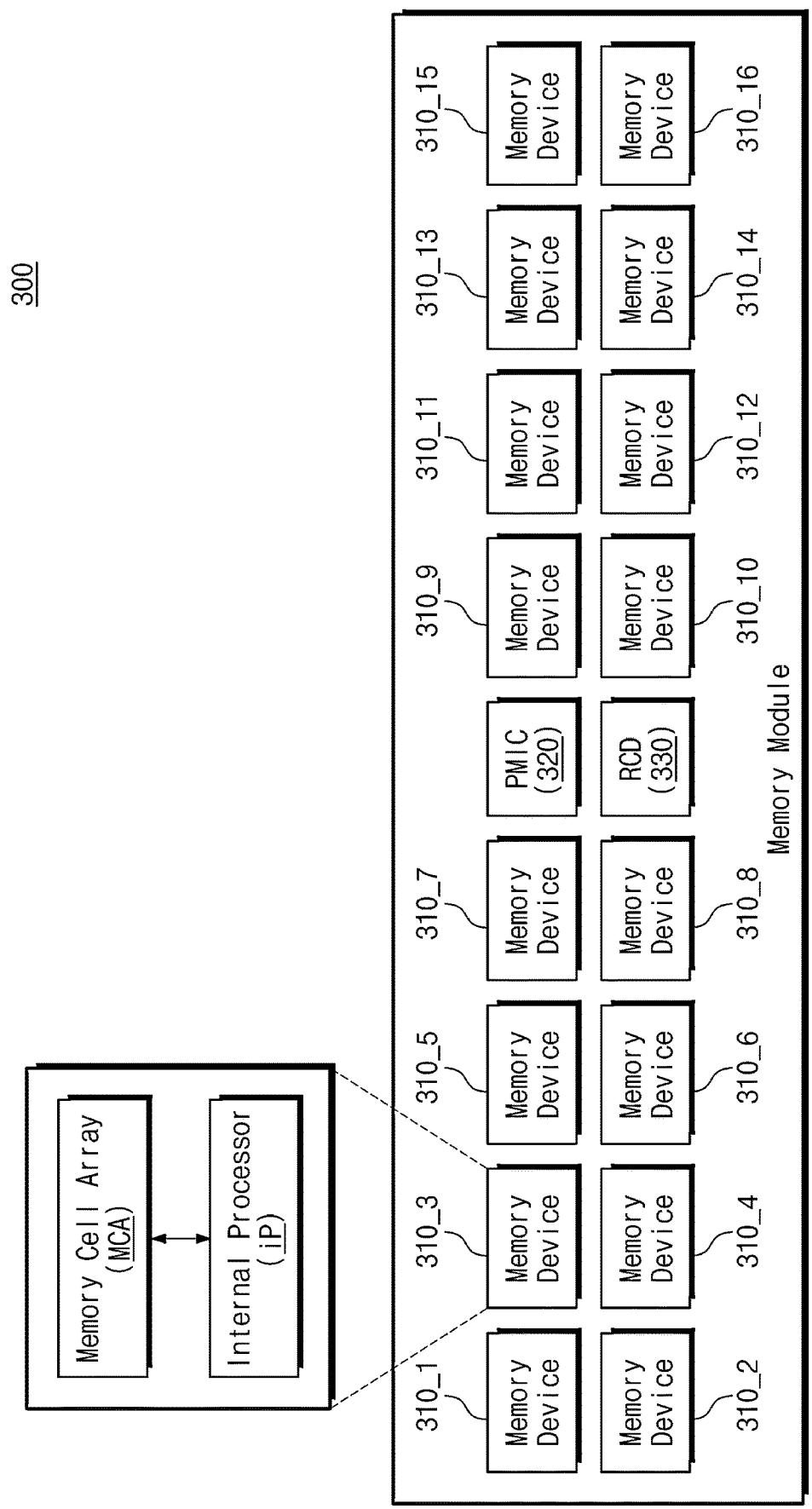
FIG. 8 is a block diagram illustrating a memory device of FIG. 4 which is implemented with a memory module.

FIG. 8 is a block diagram illustrating the CXL memory 210 of FIG. 4 implemented with a memory module 300. Referring to FIG. 4 and FIG. 8, the memory module 300 may include a plurality of memory devices 310_1 to 310_16, a power management integrated circuit (PMIC) 320, and a register clock driver (RCD) 330.

Each of the plurality of memory devices 310_1 to 310_16 may include a memory cell array MCA and an internal processor iP. That is, each of the plurality of memory devices 310_1 to 310_16 may be a processor in memory (PIM) type memory device.

The memory cell array MCA may store the plurality of data. The internal processor iP may perform an internal processing operation. For example, the internal processing operation may indicate a processing operation for the plurality of data stored in the memory cell array MCA, such as data search, data addition, data movement, data comparison, data swap, and/or data processing/calculation.

The internal processor iP may generate encoding data from at least some of the plurality of data stored in the memory cell array MCA. For example, the internal processor iP may generate encoding data by performing encoding on at least some of the plurality of data stored in the memory cell array MCA, and the encoding is based on a logical operation. That is, each of the plurality of memory devices 310_1 to 310_16 may perform encoding based on a logical operation on some of the plurality of data stored therein.

Each of the plurality of memory devices 310_1 to 310_16 may output the encoding data to outside of the memory module 300 through data lines in response to a signal provided from the register clock driver 330.

Figure 9:
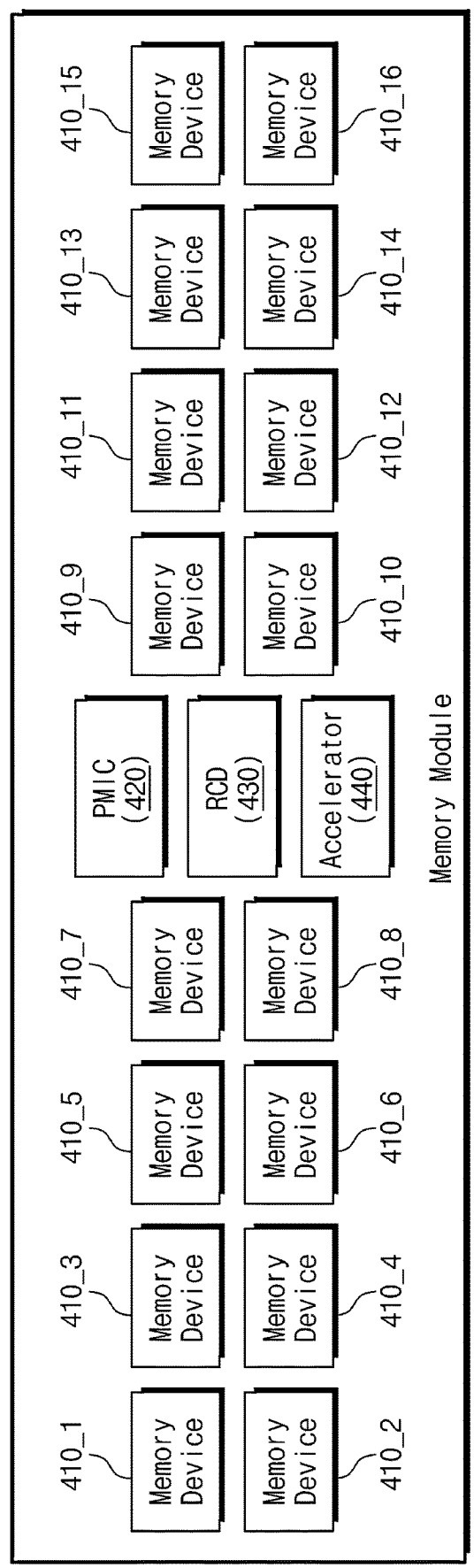
FIG. 9 is a block diagram illustrating a memory device of FIG. 4 which is implemented with a memory module.

FIG. 9 is a block diagram illustrating a memory device of FIG. 4 implemented with a memory module. Hereinafter, for convenience of description, detailed descriptions of overlapping components will be omitted.

Referring to FIG. 4, FIG. 8, and FIG. 9, a memory module 400 may include a plurality of memory devices 410_1 to 410_16, a PMIC 420, a register clock driver RCD 430, and an accelerator 440.

Each of the plurality of memory devices 410_1 to 410_16 may store a plurality of data.

The accelerator 440 may be configured to process a specific type of processing. The accelerator 440 may include at least one of various auxiliary processors such as a graphics processing unit (GPU), a digital signal processor (DSP), an image signal processor (ISP), a neural processor, or a neuromorphic processor. In some embodiments, the accelerator 440 may perform a high-speed data operation, such as an artificial intelligence (AI) data operation.

The accelerator 440 may generate encoding data by performing encoding on at least some of a plurality of data stored in the plurality of memory devices 410_1 to 410_16, and the encoding is based on a logical operation. In other words, in FIG. 8, each internal processor iP may perform encoding based on a logical operation, in FIG. 9, the accelerator 440 may perform encoding based on a logical operation. The accelerator 440 may output the generated encoding data to outside of the memory module 400.

Figure 10:
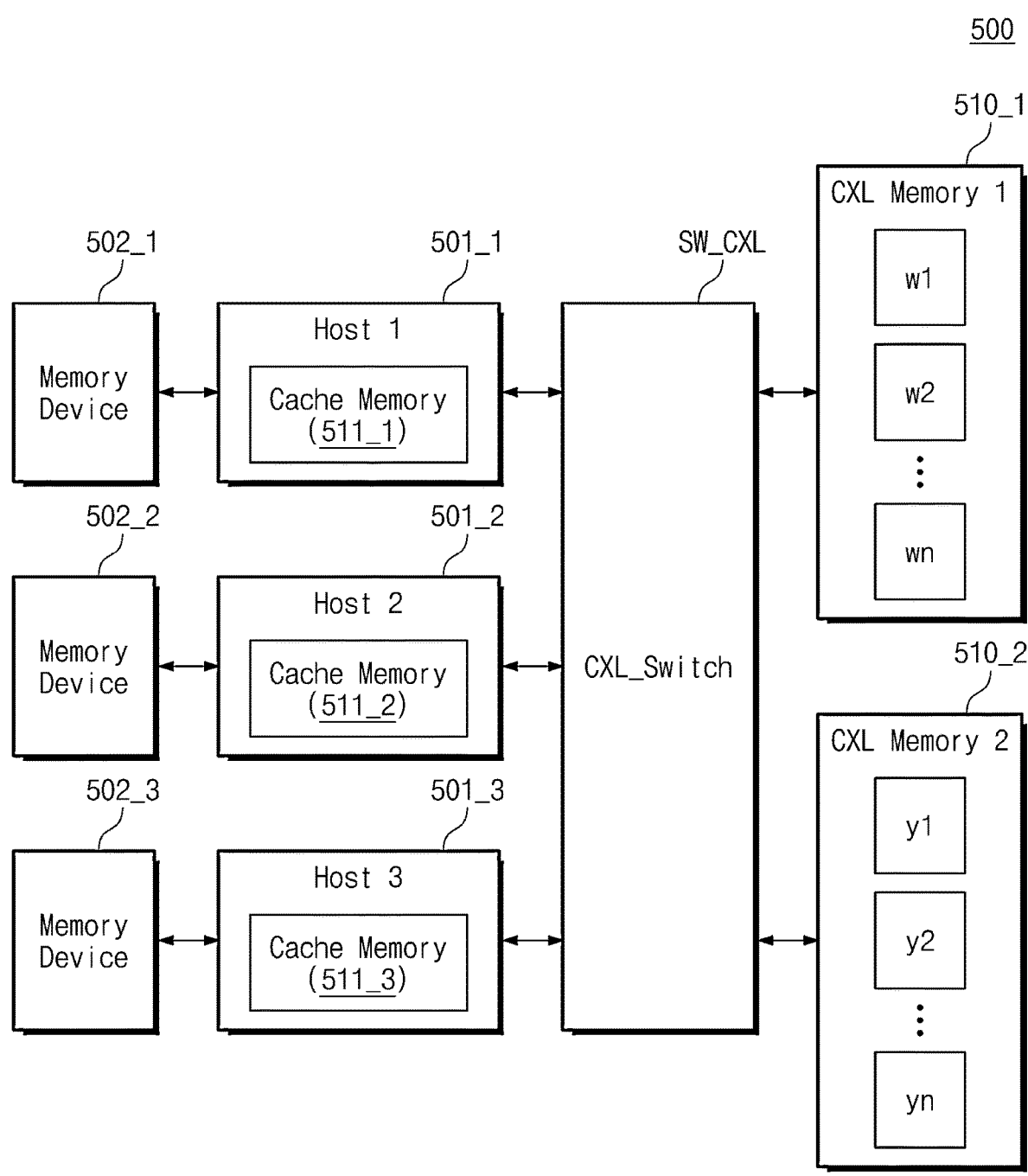
FIG. 10 is a block diagram illustrating a computing system according to some embodiments of the present disclosure.

FIG. 10 is a block diagram of a computing system 500 according to some embodiments of the present disclosure. Hereinafter, for convenience of description, detailed descriptions of overlapping components will be omitted.

Referring to FIG. 4 and FIG. 10, the computing system 500 may include first to third hosts 501_1 to 501_3, a plurality of memory devices 502_1 to 502_3, the CXL switch SW_CXL, a first CXL memory 510_1, and a second CXL memory 510_2.

The first and second CXL memories 510_1 and 510_2 may store a plurality of data, respectively. For example, the first CXL memory 510_1 may store the plurality of data w1 to wn, and the second CXL memory 510_2 may store a plurality of data y1 to yn.

The first and second CXL memories 510_1 and 510_2 may operate independently.

For example, the first CXL memory 510_1 may receive first to third data requests from the first to third hosts 501_1 to 501_3, respectively, through the CXL switch SW_CXL.

After receiving the first data request, the first CXL memory 510_1 may acquire first directory information in association with at least one data stored in a cache memory 511_1 or the memory device 502_1 through the CXL switch SW_CXL. After receiving the second data request, the first CXL memory 510_1 may acquire second directory information in association with at least one data stored in a cache memory 511_2 or the memory device 502_2 through the CXL switch SW_CXL. After receiving the third data request, the first CXL memory 510_1 may acquire third directory information in association with at least one data stored in a cache memory 511_3 or the memory device 502_3 through the CXL switch SW_CXL.

The first CXL memory 510_1 may generate first encoding data from at least some of the plurality of data w1 to wn stored in the buffer memory BFM, based on the first to third directory information. The first CXL memory 510_1 may transmit the first encoding data to each of the first to third hosts 501_1 to 501_3, in response to the first to third data requests.

For example, the second CXL memory 510_2 may receive fourth to sixth data requests from the first to third hosts 501_1 to 501_3, respectively, through the CXL switch SW_CXL.

After receiving the fourth data request, the first CXL memory 510_1 may acquire fourth directory information in association with at least one data stored in the cache memory 511_1 or the memory device 502_1 through the CXL switch SW_CXL. After receiving the fifth data request, the second CXL memory 510_2 may acquire fifth directory information in association with at least one data stored in the cache memory 511_2 or the memory device 502_2 through the CXL switch SW_CXL. After receiving the sixth data request, the second CXL memory 510_2 may acquire sixth directory information in association with at least one data stored in the cache memory 511_3 or the memory device 502_3 through the CXL switch SW_CXL.

The second CXL memory 510_2 may generate second encoding data from at least some of the plurality of data y1 to yn stored in the buffer memory BFM, based on the fourth to sixth directory information. The second CXL memory 510_2 may transmit the second encoding data to each of the first to third hosts 501_1 to 501_3, in response to the fourth to sixth data requests.

In FIG. 10, although the computing system 500 includes the first to third hosts 501_1 to 501_3 and the first and second CXL memories 510_1 and 510_2, the scope of the present disclosure is not limited thereto, and may include a plurality of hosts and a plurality of CXL memories.

Figure 11:
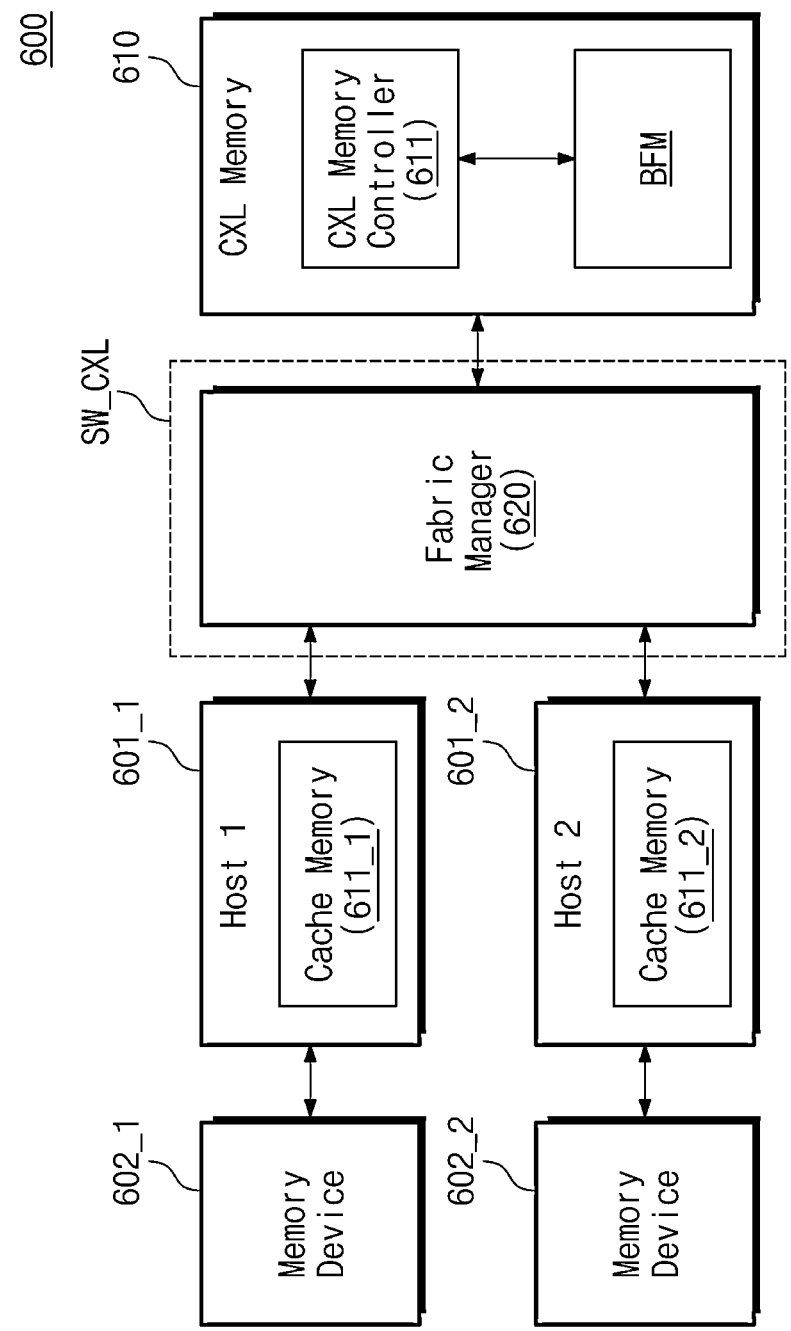
FIG. 11 is a block diagram illustrating a computing system according to some embodiments of the present disclosure.

FIG. 11 is a block diagram of a computing system 600 according to some embodiments of the present disclosure. Hereinafter, for convenience of description, detailed descriptions of overlapping components will be omitted.

Referring to FIG. 11, the computing system 600 may include first and second hosts 601_1 and 601_2, a plurality of memory devices 602_1 and 602_2, a CXL memory 610, and a fabric manager 620.

The fabric manager 620 may be configured to arbitrate communication of the first and second hosts 601_1 and 601_2 with the CXL memory 610. In some embodiments, the fabric manager 620 may be a component included in the CXL switch SW_CXL.

The fabric manager 620 may receive first and second data requests from the first and second hosts 601_1 and 601_2, respectively. After receiving the first data request, the fabric manager 620 may obtain first directory information in association with at least one data stored in a cache memory 611_1 or the memory device 602_1 from the first host 601_1. After receiving the second data request, the fabric manager 620 may obtain second directory information in association with at least one data stored in a cache memory 611_2 or the memory device 602_2 from the second host 601_2.

The fabric manager 620 may generate a third data request based on the first directory information and the second directory information. For example, the fabric manager 620 may identify first data not stored in the cache memory 611_1 or the memory device 602_1 from among the plurality of data associated with the first data request, based on the first directory information. The fabric manager 620 may identify second data not stored in the cache memory 611_2 or the memory device 602_2 from among the plurality of data associated with the second data request, based on the second directory information. The fabric manager 620 may generate the third data request for the first data and the second data by modifying the first and second data requests. The fabric manager 620 may transmit the third data request to the CXL memory 610.

In response to the third data request received from the fabric manager 620, a CXL memory controller 611 may generate encoding data by performing encoding on first data and second data among the plurality of data, and the encoding is based on a logical operation. The CXL memory controller 611 may transmit the encoding data to the fabric manager 620 in response to the third data request. The fabric manager 620 may transmit the encoding data to each of the first and second hosts 601_1 and 601_2, in response to the first and second data requests.

Figure 12:
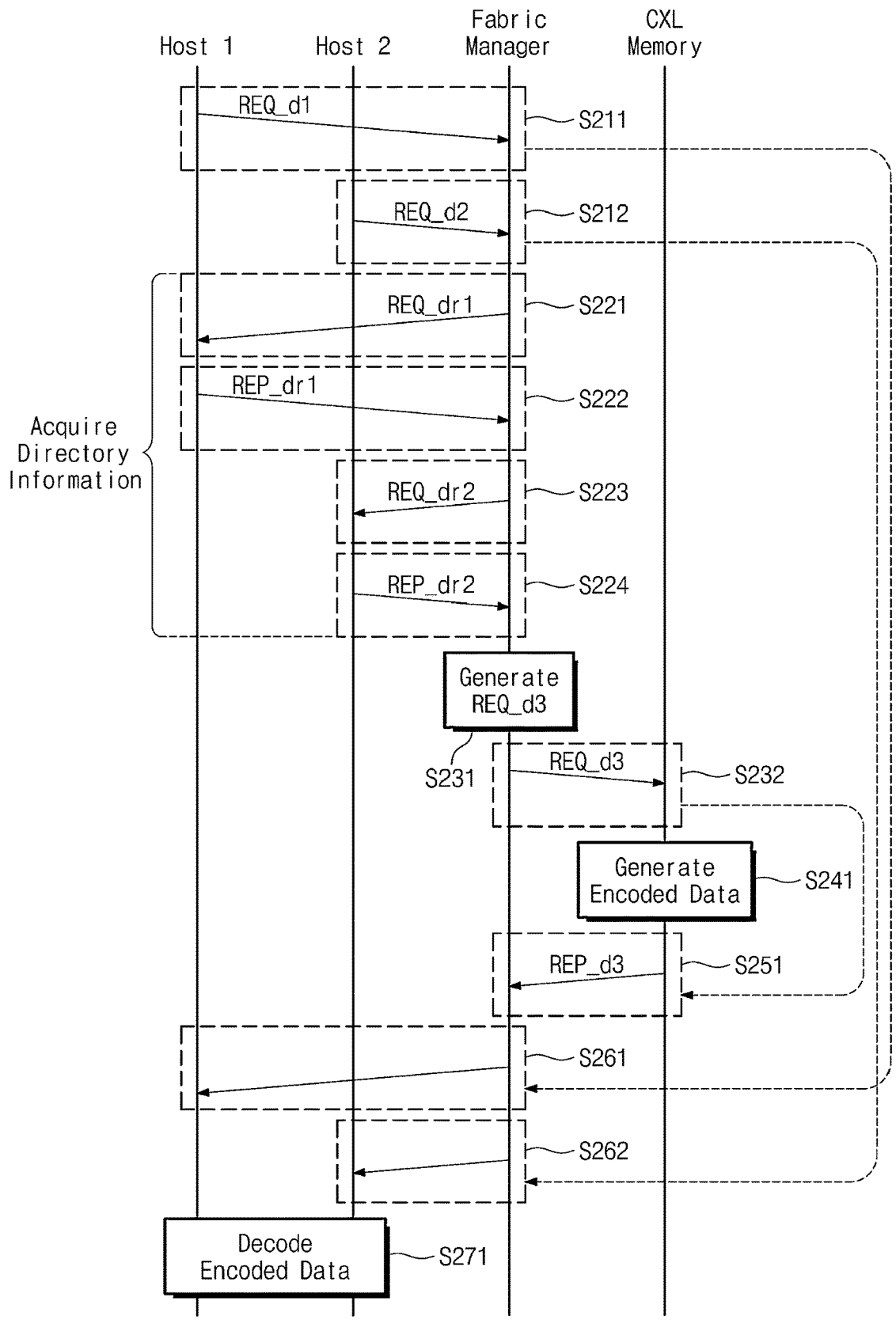
FIG. 12 is a flowchart illustrating data transmission operations of the computing system of FIG. 11.

FIG. 12 is a flowchart illustrating a data transmission operation of the computing system of FIG. 11. Referring to FIG. 11 and FIG. 12, in operation S211, the first host 601_1 may issue the first data request REQ_d1. The first data request REQ_d1 may be transferred to the fabric manager 620.

In operation S212, the second host 601_2 may issue the second data request REQ_d2. The second data request REQ_d2 may be transferred to the fabric manager 620.

In some embodiments, operations of operation S211 and operation S212 may be performed simultaneously.

The fabric manager 620 may obtain directory information in association with data stored in the cache memories 611_1 and 611_2 or the memory devices 602_1 and 602_2 from the first and second hosts 601_1 and 601_2 through operations of operation S221 to operation S224. For example, in operation S221, the fabric manager 620 may transmit the first directory information request REQ_dr1 to the first host 601_1 to obtain first directory information in association with at least one data stored in the cache memory 611_1 or the memory device 602_1.

In operation S222, the first host 601_1 may transmit the first directory information response REP_dr1 to the fabric manager 620 in response to the first directory information request REQ_dr1 received from the fabric manager 620. The first directory information response REP_dr1 may include first directory information.

In operation S223, the fabric manager 620 may transmit the second directory information request REQ_dr2 to the second host 601_2 to acquire second directory information on at least one data stored in the cache memory 611_2 or the memory device 602_2.

In operation S224, the second host 601_2 may transmit the second directory information response REP_dr2 to the fabric manager 620 in response to the second directory information request REQ_dr2 received from the fabric manager 620. The second directory information response REP_dr2 may include second directory information.

In some embodiments, operations of operation S221 and operation S223 may be performed simultaneously.

In operation S231, the fabric manager 620 may generate a third data request REQ_d3 based on the first directory information and the second directory information. For example, the fabric manager 620 may identify first data not stored in the cache memory 611_1 or the memory device 602_1 from among a plurality of data associated with the first data request REQ_d1, based on the first directory information. The fabric manager 620 may identify second data not stored in the cache memory 611_2 or the memory device 602_2 from among a plurality of data associated with the second data request REQ_d2, based on the second directory information. The fabric manager 620 may generate the third data request REQ_d3 for the first data and the second data by modifying the first and second data requests.

In operation S232, the fabric manager 620 may transmit the third data request REQ_d3 to the CXL memory 610.

In operation S241, the CXL memory 610 may generate encoding data by performing encoding based on the first logical operation on the first data and the second data among the plurality of data stored in the buffer memory BFM in response to the third data request REQ_d3.

In some embodiments, the first logical operation may be the XOR operation, but the scope of the present disclosure is not limited thereto, and the first logical operation may be one of various logical operations.

In operation S251, the CXL memory 610 may transmit third data response REP_d3 to the fabric manager 620 in response to the third data request REQ_d3 received from the fabric manager 620. The third data response REP_d3 may include the encoding data.

The fabric manager 620 may transmit the encoding data received from the CXL memory 610 to each of the first and second hosts 601_1 and 601_2, through operations in operation S261 and operation S262. For example, in operation S261, the fabric manager 620 may transmit the encoding data received from the CXL memory 610 to the first host 601_1 in response to the first data request REQ_d1. In operation S262, the fabric manager 620 may transmit the encoding data received from the CXL memory 610 to the second host 601_2 in response to the second data request REQ_d2.

In operation S271, the first and second hosts 601_1 and 601_2 may perform decoding on the encoding data received from the fabric manager 620. As a result of performing decoding, the first and second hosts 601_1 and 601_2 may acquire necessary data.

For example, the first host 601_1 may perform decoding based on a second logical operation on the encoding data received from the fabric manager 620. As a result of performing decoding, the first host 601_1 may acquire first data not stored in the first host 601_1 (e.g., the cache memory 611_1 or the memory device 602_1) from among data associated with the first data request. For example, the second host 601_2 may perform decoding based on the second logical operation on the encoding data received from the fabric manager 620. As a result of performing decoding, the second host 601_2 may acquire second data not stored in the second host 601_2 (e.g., the cache memory 611_2 or the memory device 602_2) from among data associated with the second data request.

In some embodiments, the second logical operation may be the same as the first logical operation described above. For example, the second logical operation may be the XOR operation, but the scope of the present disclosure is not limited thereto, and the second logical operation may be one of various logical operations.

Figure 13A:
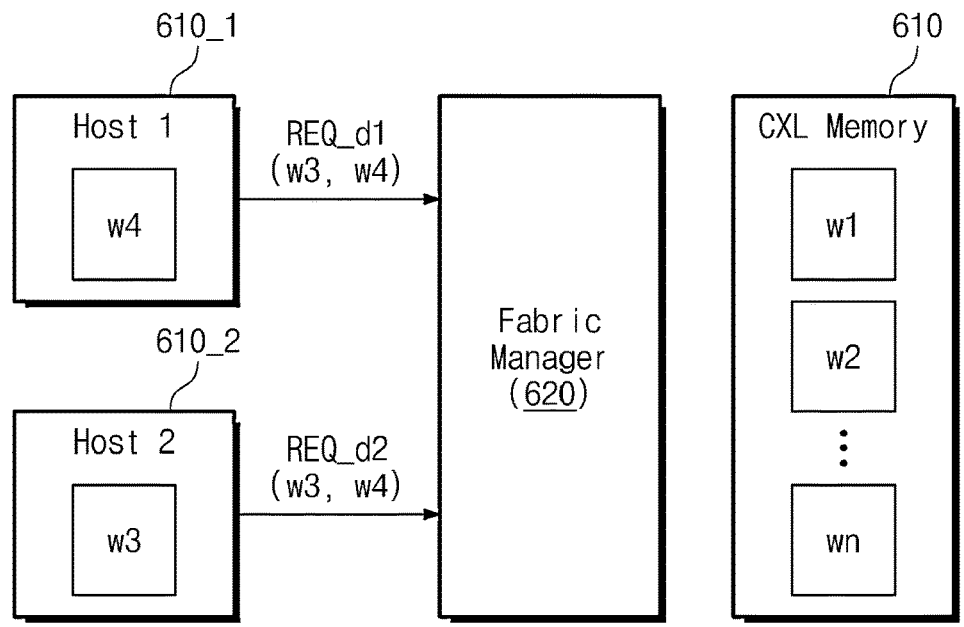
FIG. 13A, FIG. 13B, and FIG. 13C are diagrams explaining an operation of the computing system of FIG. 11.
Figure 13B:
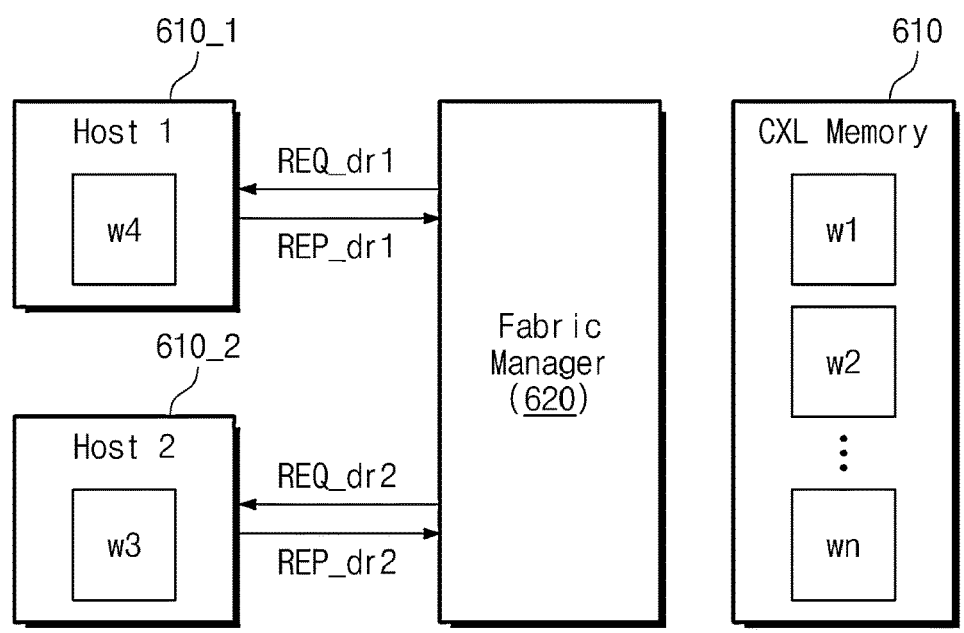
Figure 13C:
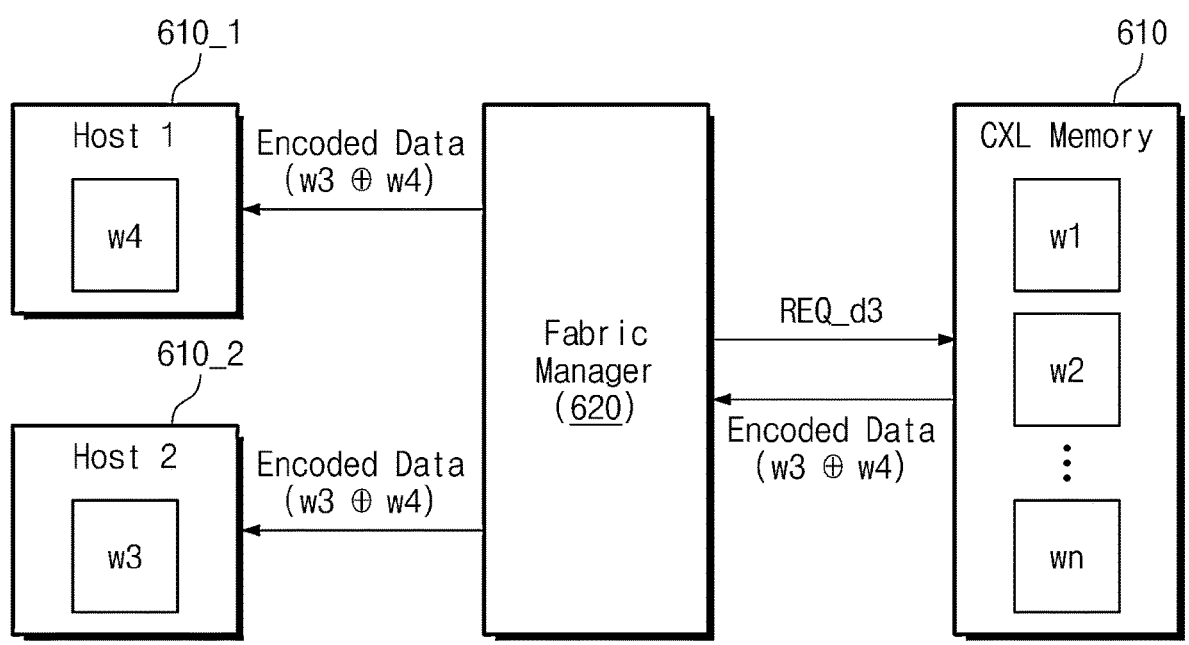

FIG. 13A, FIG. 13B, and FIG. 13C are diagrams for explaining the operation of the computing system of FIG. 11. For convenience of description and simplicity of the drawing, components of the first and second hosts 601_1 and 601_2 and the CXL memory 610 are conceptually illustrated, and some unnecessary components are omitted.

In FIG. 13A, FIG. 13B, and FIG. 13C, it is assumed that the first host 601_1 stores data w4, the second host 601_2 stores data w3, and the CXL memory 610 stores the plurality of data w1 to wn.

Referring to FIG. 11, FIG. 12, and FIG. 13A, the first and second hosts 601_1 and 601_2 may transmit the first and second data requests REQ_d1 and REQ_d2 to the fabric manager 620, respectively. The first data request REQ_d1 and the second data request REQ_d2 may be requests for data w3 and w4. That is, both the first data request REQ_d1 and the second data request REQ_d2 may be related to the data w3 and w4.

Referring to FIG. 11, FIG. 12, FIG. 13A, and FIG. 13B, after receiving the first and second data requests REQ_d1 and REQ_d2 from the first and second hosts 601_1 and 601_2, respectively, the fabric manager 620 may obtain directory information on data stored in the first and second hosts 201_1 and 201_2.

For example, the fabric manager 620 may transmit the first directory information request REQ_dr1 to the first host 601_1 to obtain first directory information on the data w4 stored in the first host 601_1. The first host 601_1 may transmit the first directory information response REP_dr1 to the fabric manager 620 in response to the received first directory information request REQ_dr1. The first directory information response REP_dr1 may include first directory information.

For example, the fabric manager 620 may transmit the second directory information request REQ_dr2 to the second host 601_2 to acquire second directory information in association with the data w3 stored in the second host 601_2. The second host 601_2 may transmit the second directory information response REP_dr2 to the fabric manager 620 in response to the received second directory information request REQ_dr2. The second directory information response REP_dr2 may include second directory information.

Referring to FIG. 11, FIG. 12, FIG. 13A, FIG. 13B, and FIG. 13C, the fabric manager 620 may generate the third data request REQ_d3 based on the first directory information and the second directory information. For example, the fabric manager 620 may identify the first data w3 not stored in the cache memory 611_1 or the memory device 602_1 from among the plurality of data w3 and w4 associated with the first data request REQ_d1, based on the first directory information. The fabric manager 620 may identify the second data w4 not stored in the cache memory 611_2 or the memory device 602_2 from among the plurality of data w3 and w4 associated with the second data request REQ_d2, based on the second directory information. The fabric manager 620 may generate the third data request REQ_d3 for the first data w3 and the second data w4 by modifying the first and second data requests. The fabric manager 620 may transmit the third data request REQ_d3 to the CXL memory 610.

In response to the third data request REQ_d3, the CXL memory 610 may generate encoding data by performing encoding based on the XOR operation on the first data w3 and the second data w4 among the plurality of data w1 to wn stored in the buffer memory BFM. In this case, the encoding data may be an XOR message, with a message form such as $\overline{w3 \oplus w4}$. The CXL memory 610 may transmit the third data response REP_d3 to the fabric manager 620 in response to the third data request REQ_d3 received from the fabric manager 620. The third data response REP_d3 may include the encoding data.

In response to the first data request REQ_d1 and the second data request REQ_d2, the fabric manager 620 may transmit the encoding data received from the CXL memory 610 to each of the first and second hosts 601_1 and 601_2.

The first host 601_1 may perform the XOR operation on the encoding data received from the fabric manager 620 and the data w4 stored in the first host 601_1 to perform decoding on the encoding data. As a result of performing decoding, the first host 601_1 may acquire the data w3.

The second host 601_2 may perform the XOR operation on the encoding data received from the fabric manager 620 and the data w3 stored in the second host 601_2 to perform decoding on the encoding data. As a result of performing decoding, the second host 601_2 may acquire the data w4.

In the above-described embodiments, components according to the technical idea of the present disclosure is described by using terms such as first, second, and third. However, terms such as first, second, third, and the like are used to distinguish components from each other, and to do not limit the present disclosure. For example, terms such as first, second, third, and the like do not imply numerical meanings in order or any form.

According to the present disclosure, in a system in which a plurality of host devices share a memory device, it is possible to improve efficiency of data transmission between the plurality of host devices and the memory device.

The above description is specific examples for implementing the present disclosure. The present disclosure will include not only the above-described embodiments, but also embodiments which may be simply changed or easily changed. In addition, the present disclosure will also include techniques which may be easily modified and implemented in the future by using the above-described embodiments.

What is claimed is:

1. A system comprising:
a first memory device configured to store a first data set; and
a compute express link (CXL) switch configured to arbitrate communication of a first host device and a second host device with the first memory device based on a CXL interface,
wherein the first memory device is configured to perform operations comprising:
receiving a first data request from the first host device through the CXL switch;
receiving a second data request from the second host device through the CXL switch;
obtaining first directory information associated with at least one data stored in the first host device from the first host device through the CXL switch;
obtaining second directory information associated with at least one data stored in the second host device from the second host device through the CXL switch;
generating first encoding data based on the first directory information and the second directory information; and
outputting the first encoding data to each of the first and second host devices through the CXL switch in response to the first data request and the second data request.

2. The system of claim 1, wherein the first memory device is configured to generate the first encoding data by performing encoding on at least some data associated with the first data request and the second data request from among a plurality of data included in the first data set, and
wherein the encoding is based on a logical operation.

3. The system of claim 2, wherein the first memory device is configured to perform operations comprising:
identifying first data not stored in the first host device from among a plurality of data associated with the first data request, based on the first directory information;
identifying second data not stored in the second host device from among a plurality of data associated with the second data request, based on the second directory information; and
performing the logical operation based on the first data and the second data.

4. The system of claim 3, wherein the at least some of the plurality of data on which the logical operation is performed, includes the first data and the second data.

5. The system of claim 2, wherein the logical operation is an XOR operation.

6. The system of claim 2, wherein the first memory device comprises a memory module including a plurality of memory devices, and
wherein the memory module includes an accelerator configured to perform the logical operation on at least some of a plurality of data stored in the plurality of memory devices.

7. The system of claim 2, wherein the first memory device comprises a memory module including a plurality of memory devices, and
wherein each of the plurality of memory devices includes an internal processor configured to perform the logical operation on at least some of a plurality of data stored in each of the plurality of memory devices.

8. The system of claim 1, wherein, when a data interruption request to stop outputting the first encoding data is received from the first host device, the first memory device discontinues outputting the first encoding data to the first host device.

9. The system of claim 1, further comprising:
a second memory device configured to store a second data set,
wherein the second memory device operates independently from the first memory device.

10. The system of claim 9, wherein the second memory device is configured to perform operations comprising:
receiving a third data request from the first host device through the CXL switch;
receiving a fourth data request from the second host device through the CXL switch;
obtaining the first directory information and the second directory information through the CXL switch;
generating second encoding data based on the first directory information and the second directory information; and
outputting the second encoding data to each of the first and second host devices through the CXL switch, in response to the third data request and the fourth data request.

11. The system of claim 1, wherein the first memory device is configured to perform operations comprising:
receiving the first data request and output a first directory information request associated with the first directory information to the first host device through the CXL switch; and receiving the second data request and output a second directory information request associated with the second directory information to the second host device through the CXL switch.

12. A system comprising:
a first memory device configured to store a plurality of data; and
a fabric manager configured to arbitrate communication of a first host device and a second host device with the first memory device based on a compute express link (CXL) interface,
wherein the fabric manager is configured to perform operations comprising:
receiving a first data request from the first host device;
receiving a second data request from the second host device;
obtaining first directory information associated with at least one data stored in the first host device from the first host device;
obtaining second directory information associated with at least one data stored in the second host device from the second host device; and
generating a third data request based on the first directory information and the second directory information and transmitting the third data request to the first memory device,
wherein the first memory device is configured to generate first encoding data in response to the third data request and to transmit the first encoding data to the fabric manager, and
wherein the fabric manager is further configured to output the first encoding data received from the first memory device to each of the first and second host devices in response to the first and second data requests.

13. The system of claim 12, wherein the first memory device generates the first encoding data by performing a logical operation on at least some of data associated with the third data request from among the plurality of data.

14. The system of claim 13, wherein the fabric manager is further configured to perform operations comprising:
identifying first data not stored in the first host device from among a plurality of data associated with the first data request, based on the first directory information; and
identifying second data not stored in the second host device from among a plurality of data associated with the second data request, based on the second directory information,
wherein the third data request is associated with the first data and the second data.

15. The system of claim 13, wherein the logical operation is an XOR operation.

16. A system comprising:
a first host device and a second host device;
a first memory device configured to store a plurality of data; and
a compute express link (CXL) switch configured to arbitrate communication between the first and second host devices and the first memory device based on a CXL interface,
wherein the first host device transmits a first data request to the first memory device through the CXL switch and the second host device transmits a second data request to the first memory device through the CXL switch, and
wherein after receiving the first and second data requests, the first memory device is configured to perform operations comprising:
obtaining first directory information associated with at least one data stored in the first host device from the first host device through the CXL switch;
obtaining second directory information associated with at least one data stored in the second host device from the second host device through the CXL switch;
generating first encoding data based on the first directory information and the second directory information; and
outputting the first encoding data to each of the first and second host devices through the CXL switch in response to the first and second data requests.

17. The system of claim 16, wherein the first memory device is configured to generate the first encoding data by performing a logical operation on at least some of data associated with the first and second data requests from among the plurality of data.

18. The system of claim 17, wherein the first memory device is configured to perform operations comprising:
identifying first data not stored in the first host device from among a plurality of data associated with the first data request, based on the first directory information;
identifying second data not stored in the second host device from among a plurality of data associated with the second data request, based on the second directory information; and
performing the logical operation, based on the first data and the second data.

19. The system of claim 17, wherein each of the first and second host devices performs decoding based on the logical operation on the first encoding data.

20. The system of claim 16, wherein each of the plurality of data is divided into first sub data and second sub data,
wherein the first host device is configured to store the first sub data of each of the plurality of data, and
wherein the second host device is configured to store the second sub data of each of the plurality of data.

* * * * *